(12) United States Patent
Fein

(10) Patent No.: US 9,122,969 B2
(45) Date of Patent: Sep. 1, 2015

(54) DUAL TRANSPONDER RADIO FREQUENCY IDENTIFICATION

(75) Inventor: Michael Fein, Grayslake, IL (US)

(73) Assignee: ZIH Corp., Lincolnshire, IL (US)

( * ) Notice: Subject to any disclaimer, the term of this patent is extended or adjusted under 35 U.S.C. 154(b) by 753 days.

(21) Appl. No.: 13/109,822

(22) Filed: May 17, 2011

(65) Prior Publication Data

US 2012/0019363 A1 Jan. 26, 2012

Related U.S. Application Data

(60) Provisional application No. 61/345,490, filed on May 17, 2010.

(51) Int. Cl.
*H04Q 5/22* (2006.01)
*G06K 19/077* (2006.01)
*G06K 19/07* (2006.01)

(52) U.S. Cl.
CPC ........ *G06K 19/07749* (2013.01); *G06K 19/072* (2013.01); *G06K 19/07767* (2013.01)

(58) Field of Classification Search
CPC .......... G06K 19/072; G06K 19/07749; G06K 19/07767
USPC ....................................................... 340/10.1
See application file for complete search history.

(56) References Cited

U.S. PATENT DOCUMENTS

| | | | |
|---|---|---|---|
| 6,398,116 B1 * | 6/2002 | Kreft ............................. | 235/492 |
| 8,542,834 B1 * | 9/2013 | Feikis et al. .................. | 380/270 |
| 2004/0030360 A1 * | 2/2004 | Eini et al. ...................... | 607/39 |
| 2004/0046643 A1 * | 3/2004 | Becker et al. ................. | 340/10.41 |
| 2006/0066441 A1 | 3/2006 | Knadle et al. | |
| 2006/0105783 A1 * | 5/2006 | Giraldin et al. .............. | 455/456.3 |
| 2006/0232419 A1 | 10/2006 | Tomioka et al. | |
| 2007/0101093 A1 * | 5/2007 | Lawrence ...................... | 711/170 |
| 2007/0243851 A1 * | 10/2007 | Shoarinejad et al. ........ | 455/343.2 |

(Continued)

FOREIGN PATENT DOCUMENTS

EP 1862951 A1 12/2007

OTHER PUBLICATIONS

Dacuña et al., "Near-field UHF tags based on metamaterials concepts." *AIDA Centre*, Signal Theory and Communications Dept., 3 pages, (2007).

(Continued)

*Primary Examiner* — Naomi Small
(74) *Attorney, Agent, or Firm* — Alston & Bird LLP

(57) ABSTRACT

Embodiments are discussed herein related to radio frequency identification ("RFID") and, more particularly, to systems, methods, apparatuses, computer readable media products and other means for integrating two transponders into a tag, where each transponder functions independent from and does not couple with the other transponder. In some embodiments, one of the transponders can be a near field RFID transponder and the other a far field transponder. The near field RFID transponder can be used to, among other things, authenticate the far field RFID transponder. In some embodiments, the far field RFID transponder can be encoded to transmit generic information, while the near field RFID transmits more detailed or user-specific information. Additionally, in some embodiments, the near field and far field RFID transponders can operate in accordance with the same wireless protocol and include their own circuitry and antenna.

20 Claims, 26 Drawing Sheets
(13 of 26 Drawing Sheet(s) Filed in Color)

(56) References Cited

U.S. PATENT DOCUMENTS

| | | | |
|---|---|---|---|
| 2008/0030324 A1 | 2/2008 | Bekritsky et al. | |
| 2008/0150719 A1 | 6/2008 | Cote et al. | |
| 2008/0223925 A1* | 9/2008 | Saito et al. | 235/380 |
| 2008/0319905 A1* | 12/2008 | Carlson | 705/44 |
| 2009/0009295 A1* | 1/2009 | Rofougaran | 340/10.1 |
| 2009/0066516 A1* | 3/2009 | Lazo | 340/572.7 |
| 2010/0106224 A1* | 4/2010 | Von Arx et al. | 607/60 |
| 2010/0159953 A1* | 6/2010 | Aubert et al. | 455/456.2 |

OTHER PUBLICATIONS

Lee et al., "Dual-Band Dipole Antenna for RFID Tag Applications,"*Proceedings of the 38th European Microwave Conference* pp. 995-997, (2008).

PCT International Search Report for application PCT/US2011/036819 mailed Nov. 6, 2012.

\* cited by examiner

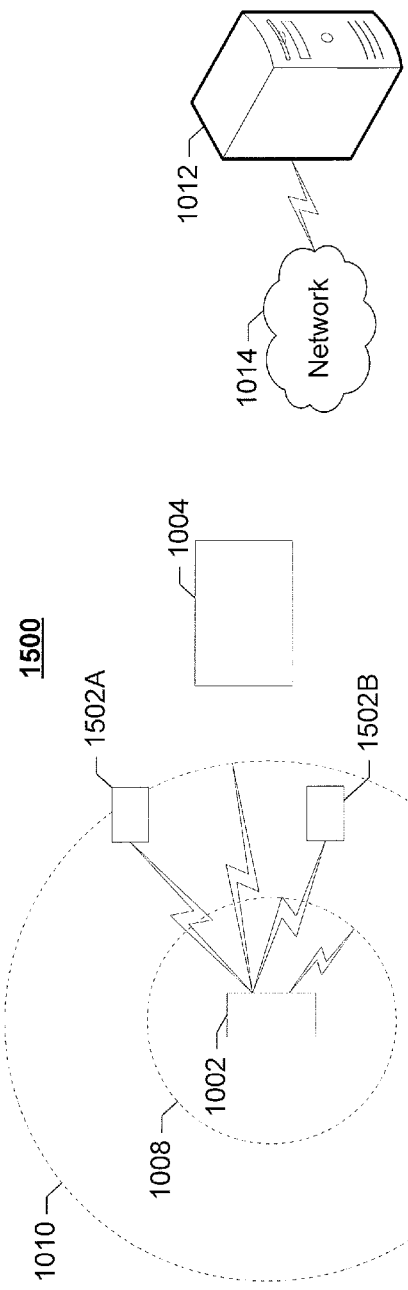
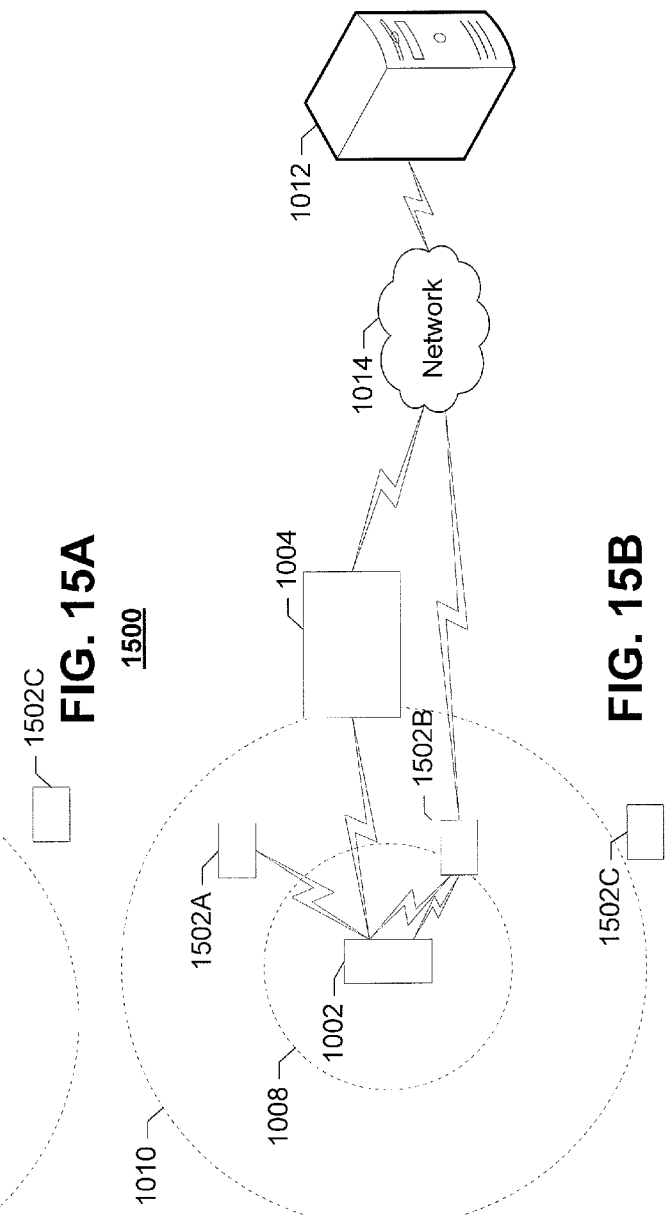
FIG. 15A
FIG. 15B

DUAL TRANSPONDER RADIO FREQUENCY IDENTIFICATION

CROSS-REFERENCE TO RELATED PATENT APPLICATION

This application claims the benefit of U.S. Provisional Application No. 61/345,490, filed May 17, 2010, titled "DUAL TRANSPONDER RADIO FREQUENCY IDENTIFICATION," which is herein incorporated by reference in its entirety.

FIELD

Embodiments discussed herein are related to radio frequency identification ("RFID") and, more particularly, to systems, methods, apparatuses, computer readable media products and other means for transmitting and reading different data from a single RFID tag.

BACKGROUND

RFID transponders, either active or passive, are sometimes used with a RFID reader for communicating information. Active RFID transponders can have an independent source of power, such as a battery, while passive RFID transponders are typically powered by wireless radiation. RFID readers can be a source of such radiation.

A RFID reader is usually configured to transmit a radio frequency ("RF") electromagnetic field, which can include a data signal. In the case of a passive ultra high frequency ("UHF") transponder, the RF electromagnetic field, sometimes called an interrogation signal, energizes the transponder, thereby enabling the transponder to respond by modulating the interrogation signal using a technique called backscattering. Other communication protocols may be used depending, at least in part, on whether the selected transponder is passive or active, whether the transponder is configured as a near field transponder or as a far field transponder, and/or other factors as may be known to those skilled in the art.

A number of deficiencies and problems associated with manufacturing, using, operating, and communicating with conventional RFID transponders are identified herein. Through applied effort, ingenuity, and innovation, exemplary solutions to many of these identified problems are embodied by the present invention, which is described in detail below.

BRIEF SUMMARY

Embodiments include systems, apparatuses, methods computer readable media and other means for providing a combined near field ("NF") and far field ("FF") UHF card or other type of dual-transponder tag that may contain two separate RFID transponders. As used herein, "tag" refers to a physical medium that includes at least one transponder. "Transponder" as referenced herein includes at least one antenna and circuitry. "Circuitry" as used herein refers to a processor, other type of control means, and/or memory. "Memory" is anything that can store data, such as a non-transitory storage device. A "storage device," as referred herein, can include one transponder's memory or a plurality of transponders' memory. For example, a tag can include two storage devices (e.g., a NF storage device and a FF storage device), or a single storage device that includes NF memory and FF memory. Each transponder can also have a unique identification code ("UID"), such as those sometimes programmed during the manufacturing of the transponder.

As referred to herein, "reader" is a device configured to generate, receive and process electrical communication signals from one or more transponders. For example, a reader may be a combination of a receiver and a transmitter. One skilled in the art would appreciate that similar devices, including various transmitters, receivers, or transmitter-receivers, may be used within embodiments of this invention.

RFID transponders can be active or passive, and are sometimes used with a RFID reader for communicating information. As referred to herein, communicating includes contact communications, magnetic coupling, backscatter communications and/or any other type of communications suitable for use with RFID transponders. Active RFID transponders can have an independent source of power, such as a battery, while passive RFID transponders are typically powered by wireless radiation, such as an interrogation signal. As noted above, RFID readers can be a source of such radiation. A third type of transponder is a hybrid of the active transponder and passive transponder, and is sometimes referred to herein as a "semi-passive RFID transponder." A semi-passive RFID transponder is typically activated by a wireless source of radiation and provides a modulated response to the activation signal, similar to a passive RFID transponder, but a semi-passive transponder also includes a battery or other independent power source, similar to an active transponder. The battery can be used to extend the hybrid transponders' read range (as compared to a similar passive RFID transponder). In many instances, the hybrid transponder may still function like a passive transponder if the battery goes dead, albeit with a relatively shorter read range than when operating in a battery powered mode.

In some embodiments, the near field transponder and the far field transponder can operate using the same communications protocol, and actively function simultaneously (which as used herein includes near-simultaneously) while, e.g., receiving the same interrogation signal. For example, the far field transponder can be configured to provide several meters of read range, while the near field transponder can be configured to be read only within a relatively smaller area (within, e.g., a few meters or tenths of a meter). In this regard, both transponders of a RFID tag can be configured to communicate wirelessly with a RFID reader that is configured to implement a single type of wireless communications protocol.

Although the near field and far field transponders may be located in close proximity to each other (e.g., on the same credit-card size tag), embodiments discussed herein provide for RFID tag configurations that reduce and, in some embodiments, effectively prevent the near field transponder from coupling wirelessly to the far field transponder when the near field transponder, the far field transponder, and/or both transponders are active (e.g., modulating, transmitting, or otherwise, sending a data signal). In other embodiments, the RFID tag can include one or more independent power sources, such as a battery, and at least one of the far field transponder and the near field transponder may be an active or semi-passive RFID transponder.

Independent of the type(s) of protocols used by the transponders, the far field transponder can be configured to transmit different data than the near field transponder of the same RFID tag. For example, the far field transponder can be configured to transmit generic data, while its corresponding near field transponder can be configured to transmit user-specific data, which may or may not be related to the generic data. For example, the user-specific data can be configured to have a species relationship to the generic or other type of data transmitted by the far field transponder. For example, the generic data can comprise access data that can be configured to authorize a user's physical access to an area, while the user-specific data can comprise transaction data that is configured to authorize a financial transaction performed by the user within the accessed area.

Various antenna configurations can be used for the near field and far field transponders. For example, the near field antenna can comprise a loop antenna, shielded antenna, or any other type of suitable antenna (some examples of which are discussed herein).

The far field antenna, for example, can be an open bowtie antenna, a slot antenna, a bowtie antenna, among others.

In some embodiments, FF data and/or the NF data can be used to authenticate the RFID tag. For example, the FF data may include a unique FF identifier and the NF data may include a unique NF identifier. The unique FF identifier and the unique NF identifier can be associated with each other and stored in a RFID tag and/or in an online database or server. In such an online environment, the unique FF identifier, or other portion of the FF data, can then be used to look up information identifying the RFID tag's near field transponder. In some embodiments, such as embodiments where the RFID reader is configured to independently decrypt (e.g., decrypt without accessing another networked device, such as a network database or server) NF data and/or FF data stored in memory of the RFID tag. For example, NF and FF memory can be included in the same storage device or in different storage devices included in the RFID tag, and can be configured to store a combination of the unique FF identifier and the unique NF identifier. As another example, each transponder can have its own storage device, wherein the NF storage device and/or the FF storage device does not include any information related to the other transponder. Keeping FF data separate from related NF data (and vice-versa) is another exemplary layer of security that may be used by dual-transponder tags in accordance with some embodiments.

One or more of a dual-transponder tag's transponders can be programmed or otherwise encoded by a printer-encoder or other device that includes, for example, a coupler array. The coupler array can include a number of transceivers configured to locate and encode each transponder on the RFID tag. For example, the coupler array can include a removable module that includes couplers aligned to be optimally positioned relative to the near field transponder and/or the far field transponder on a specific type of RFID tag (such as those shown in FIGS. 5A, 6A, 7A and 8A). The coupler array can utilize the FF data and/or the NF data to distinguish the far field transponder and the near field transponder before, during or after encoding. In some embodiments, to assist with encoding the RFID tag, the far field transponder and/or the near field transponder can be preprogrammed (at, e.g., the manufacturer) with identifying header data that can be used by the coupler array to distinguish the far field transponder and the near field transponder. In such embodiments, the coupler array can be configured to erase the identifying header data from either or both of the transponders after encoding at least one of the transponders. Other encoding devices that do not include a coupler array may be configured to encode dual-transponder RFID tags in accordance with embodiments discussed herein.

After the RFID tag is encoded, the tag can be configured to communicate wirelessly with an RFID reader using one or more anti-collision protocols (sometimes referenced herein as "RFID protocols" or, more broadly, "wireless protocols"). The RFID reader can comprise, for example, at least one RFID antenna, an independent power source, and various types of circuitry.

The RFID reader can be configured to, for example, simultaneously (which as used herein includes near-simultaneously as would be understood to those skilled in the art) receive RFID signals derived from data stored on more than one more transponder (including unique transponder identifiers) from one or more RFID tags, and determine whether the transponders are associated with the same RFID tag. A first RFID signal can be received in response to the RFID reader transmitting a first interrogation signal. Similarly, a second RFID signal can be received in response to the RFID reader transmitting a second interrogation signal. The first and second interrogation signals can be different or the same (which as used herein, the "same" includes "substantially the same"). If the RFID reader is configured to transmit different interrogation signals, the second interrogation signal can be dynamically targeted at a particular transponder or type of transponder.

In response to and/or while determining that the first RFID data signal and a second RFID data signal are associated with same RFID tag, the RFID reader can be configured to initiate the display of information (such as a name and picture associated with the user), the retrieval of data from a network device (such as a unique identifier for an associated near field transponder), the performance of an action (such as unlock a door or initiate an electronic payment), any other action, or combination thereof The RFID reader, in response to determining the first RFID data signal and the second RFID data signal are not associated with same RFID tag, can be configured to transmit an interrogation signal and continue waiting for a response from a near field transponder that corresponds with the transponder associated with the first data signal and/or the second data signal.

The RFID reader can also include, for example, communications circuitry configured to communicate with a network device. The communications circuitry, for example, can execute instructions requesting a database record stored at the network device. The database record can be associated with and/or accessed based upon, for example, FF data, NF data, any other type of RFID tag data, or any combination thereof. The network device can respond to the received data by, for example, sending to the RFID reader network data identifying a near field transponder that corresponds with far field transponder in the RFID tag. In addition to or instead of utilizing a network device, the RFID reader can be configured to utilize the RFID tag's data to independently determine (e.g., without accessing a network device) whether the near field transponder and far field transponder are associated with the RFID tag. For example, an authentication protocol may comprise inputting into a validation algorithm, the algorithm being previously stored or downloaded in the RFID reader, at least a portion of the first and/or second received RFID tag data signal(s) and one or more decryption keys stored and/or retrieved by the RFID reader. The output of the validation algorithm can then be used to determine whether or not the first and/or second transponder's data is associated with the RFID tag. In some embodiments, the key can be derived from the first and/or second received RFID tag data signal(s) and/or retrieved from a network device. Additionally or alternatively, any other device(s) (such as a networked device) can be configured to perform one or more of the functions discussed in connection with the RFID reader.

Some embodiments can also provide a method of communicating wirelessly with a RFID reader comprising: receiving a triggering event, and in response to receiving the triggering event: sending FF data associated with a RFID tag such that the FF data is readable within a first read range; and sending NF data associated with the RFID tag such that NF data is readable within a second read range that is smaller than the first read range. The NF and FF data can be different and/or sent in accordance with the same wireless protocol(s).

Embodiments also may include a method for authenticating an RFID tag comprising: receiving a first data signal associated with a first transponder incorporated in the RFID tag; receiving a second data signal (which may be different than the first data signal); determining, with circuitry, whether the second data signal associated with a second transponder incorporated in the RFID tag. The first data signal and the second data signal may be sent, for example, using the same wireless protocol(s).

Additionally, a non-transitory computer readable medium is disclosed. The non-transitory computer readable medium can include, for example, computer program code including instructions for: waiting to receive a triggering event; determining the triggering event has been received; and in response to determining the triggering event has been received: transmitting FF data associated with an RFID tag such that the FF data is readable within a first read range; and transmitting NF data associated with the RFID tag such that the NF data is readable within a second read range that is smaller than the first read range. The NF and FF data can be different and/or sent in accordance with the same wireless protocol(s).

Also disclosed is a non-transitory computer readable medium comprising computer program code including instructions for: waiting to receive a first data signal associated with a first transponder in a RFID tag; determining the first data signal was received; waiting to receive a second data signal associated with a second transponder; determining whether the second transponder is associated with the RFID tag.

Methods of manufacturing are also discussed herein. For example, a method of manufacturing a RFID tag can comprise: coupling with a first transponder included in the RFID tag; encoding the first transponder included in the RFID tag; coupling with the second transponder included in the RFID tag; and encoding the second transponder included in the RFID tag. The data encoded onto each transponder can be different and/or encoded in accordance with the same wireless protocol(s).

Some embodiments also include a method of encoding RFID tags, comprising: communicating with a plurality of transponders each included in one of a plurality of RFID tags, wherein each of the plurality of the transponders are of the same type of transponder; encoding each of the plurality of the transponders as a group; selecting a first tag of the plurality of the RFID tags; communicating with a second transponder included in the first tag; and encoding the second transponder included in the first tag.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

Having thus described the invention in general terms, reference will now be made to the accompanying drawings, which are not necessarily drawn to scale, and wherein:

FIGS. 15A and 15B show read range illustrations of a dual-transponder tag and an example of a multi-RFID reader system in accordance with some embodiments;

DETAILED DESCRIPTION

Figure 1A:
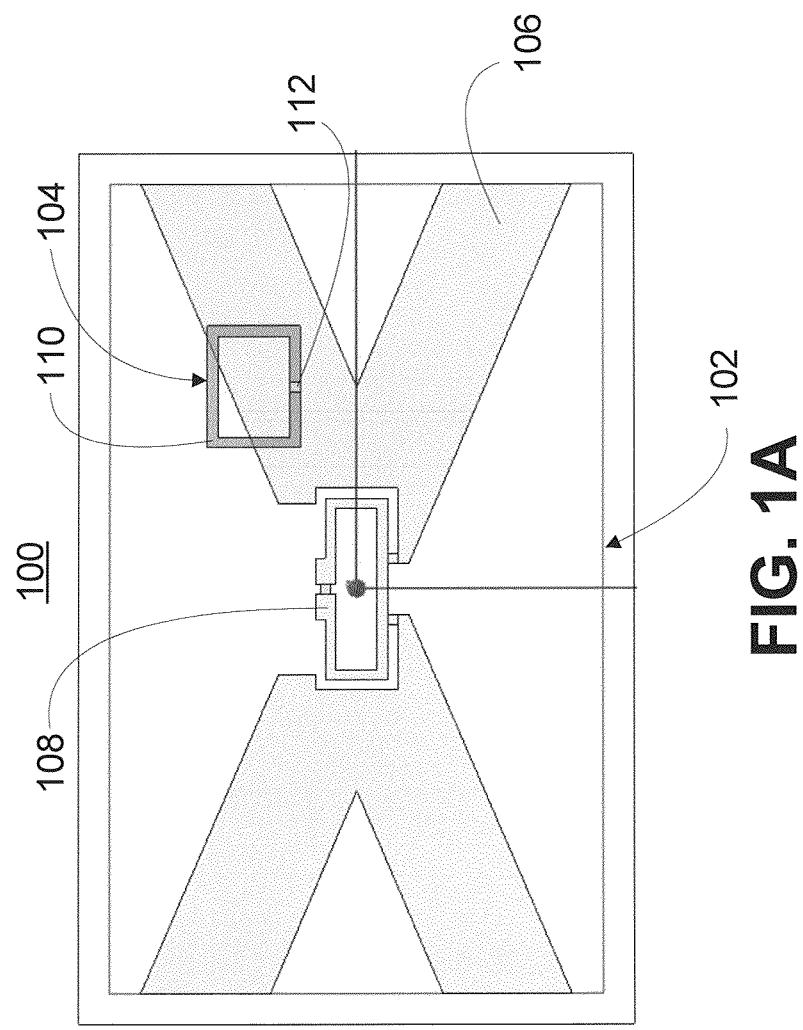
FIGS. 1A and 2B show examples of components of dual-transponder tags and corresponding read range tables for each transponder included in the tags.

While the relatively long range of far field RFID transponders provides benefits, it can also be problematic from privacy and security standpoints, among others. Near field RFID transponders, on the other hand, can be used for both identification and security access systems. For example, a near field RFID transponder can store data and send (e.g., modulate, broadcast, or otherwise transmit) a corresponding wireless signal that, when received and authorized by a RFID reader system, causes the unlocking of electrically controlled door locks. In this regard, RFID transponders can be integrated into a keychain fob or thin, credit-card sized piece of plastic.

However, both near field and far field UHF transponder data can be wirelessly skimmed by a hacker without the user's knowledge if the hacker is within reading range of target transponder. While each transponder usually has a UID, which helps reduce the risk of physically cloning a tag, transponders are still vulnerable to software emulation. More specifically, with knowledge of the UID and other transponder data (obtained by skimming the card), a hacker could electronically emulate the behavior of the transponder's circuitry without physically cloning the transponder.

Another problem arises when RFID transponders are used to identify legitimate items, such as pharmaceuticals, that may have value on an illegitimate market. For example, if a pharmaceutical company uses RFID tags to identify certain types of drugs, a thief may be able to locate and target a truck carrying the drugs based on the RFID tags' wireless signals. One emerging solution to such a problem is to utilize a dual-mode RFID transponder. A dual-mode RFID transponder can be programmed to have two distinct modes, namely a public mode and a private mode. In the public mode, the RFID transponder will only transmit generic information, such as manufacturer name, that any RFID reader within range may be able to read. However, after receiving an authenticated excitation signal (which may be generated after a user provides a passcode or authentication information to a RFID reader or other device), the RFID transponder can enter a second mode and make private data wirelessly available, such as the name of the drug and dosage information.

Because a dual-mode transponder has only one set of circuitry, it avoids a number of problems that arise when trying to place two independently-functioning RFID transponders in close proximity to each other. For instance, if instead of using a dual-mode transponder, the transponders' private information was stored and provided wirelessly by a near field transponder and public information was stored and provided wirelessly by a far field transponder, both being located on the same pharmaceutical label-type tag and, absent implementation of embodiments discussed herein, the proximity of the two transponders would likely cause the far field transponder to wirelessly couple with and amplify the near field transponder, thereby transmitting the private information a much greater distance.

Although coupling near field transponders to a FF antenna may be a problem when trying to keep some information private, there are a number of situations that benefit from a near field transponder's range being extended by a proximately-located FF antenna. In fact, much research and innovation has focused on maximizing the coupling potential between a FF antenna and a near field transponder in the same RFID tag. FIGS. 1A, 2A, 3 and 4 show examples of near field transponders incorporated in the same RFID tag as a far field transponder, where the near field transponder couples wirelessly with the far field transponder. This coupling would extend the read range of the near field transponder.

While extending the read range of the near field transponder may be beneficial for some applications, the examples of FIGS. 1A, 2A, 3 and 4 are, for the most part, included herein to demonstrate one of the technical challenges the inventor overcame in conceiving some embodiments of the present invention. In particular, the inventor discovered these combinations of transponders in search for transponders that would not couple together if proximately located.

FIG. 1A shows tag 100, which includes far field transponder 102 and near field transponder 104. Far field transponder 102 includes bowtie antenna 106 and FF circuitry 108. Near field transponder 104 includes loop antenna 110 and NF circuitry 112.

Figure 1B:
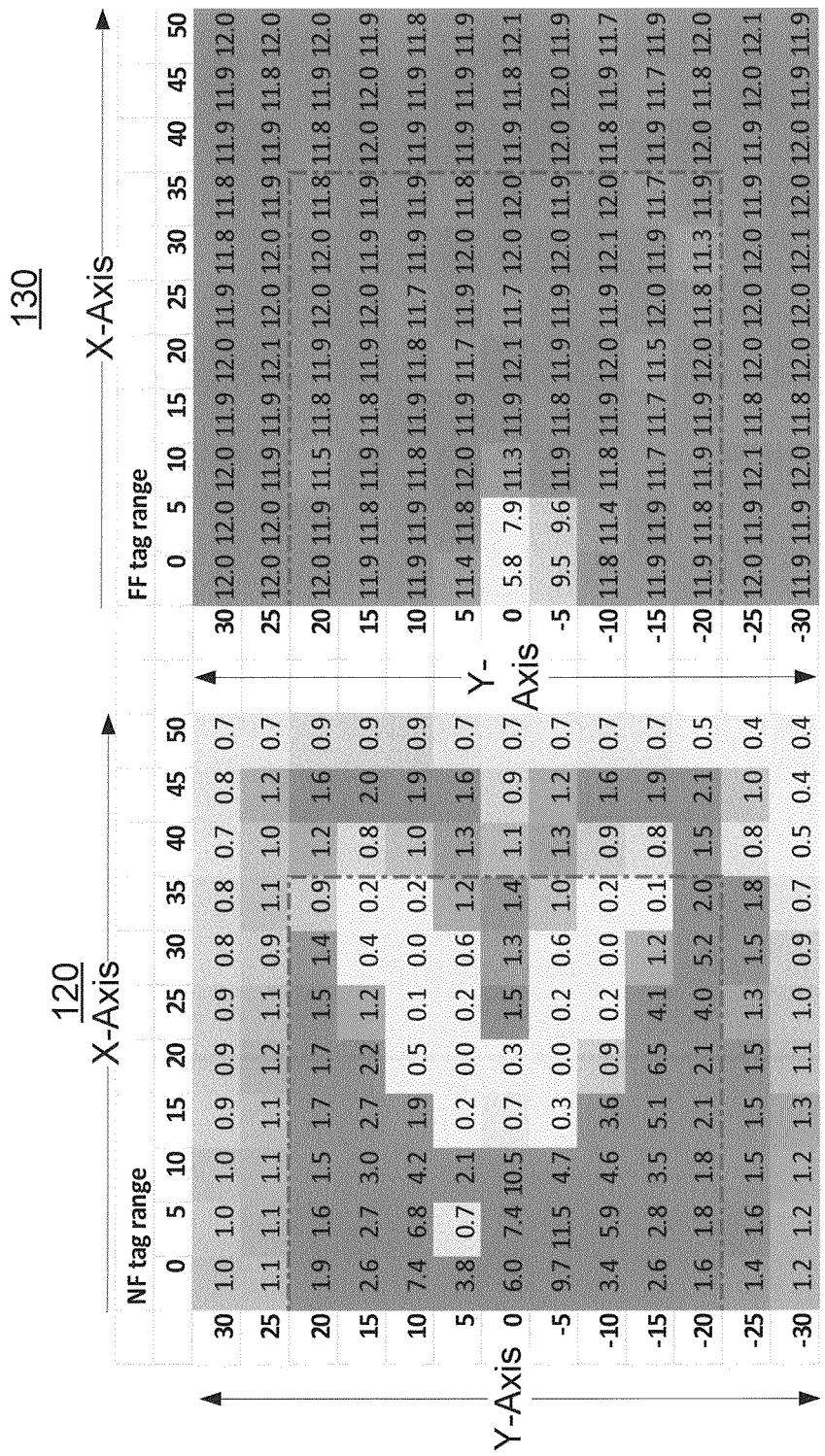

FIG. 1B shows table 120 and table 130. Tables 120 and 130 include exemplary simulation results based on where near field transponder 104 is physically located on tag 100 relative to the location of far field transponder 102. Should tag 100 take the form factor of a CR 80 tag (known to those skilled in the art) or other similarly-sized apparatus, the edge of tag 100 is shown by the dash-dot-dash line in each of tables 120 and 130. Table 120 includes simulation results associated with the read ranges of near field transponder 104 relative to the location on tag 100. Table 130 includes simulation results associated with the read ranges of far field transponder 102 relative to near field transponder 104's location on tag 100.

The simulation results discussed herein are based on the near field transponder and the far field transponder being positioned in parallel planes separated by approximately 50 microns. The read range used to generate the simulation results are based on 1 Watt transmit power at 915 MHz, and include a polarization mismatch of 0.5. That polarization mismatch was selected to simulate circularly polarized transmit antennas of an RFID reader communicating with linearly polarized antennas of each tag. Additionally the simulation results discussed herein are based on chip sensitivity of −18 dBm. As such, the simulation results represent the maximum range from the RF source, such as an RFID reader or other interrogator, that can produce −18 dBm of power at the chip terminals. The range being of the forward link, which is often the limiting factor of read range.

In this regard, some of the embodiments discussed herein (see, e.g., FIGS. 5A and 8B) are optimized for these parameters. One skilled in the art will appreciate that various horizontal spacing arrangements and other parameters are also possible.

The X-axis and Y-axis of each table includes measurements in millimeters from the center of tag 100. As such, tag 100 is shown as being 40 mm wide (as shown by the Y-axis measurements) and 70 mm long (as shown by the X-axis measurements). In this regard, tag 100 is incorporated into an area that is equal to or less than 45 mm by 75 mm. Tables 120 and 130 only show simulation results for the right half of tag 100, because the symmetric nature of bowtie antenna 106 causes the simulation results for the left half of tag 100 to mirror those shown relative to the X-axis.

The numbers included in each box of tables 120 and 130 represent the maximum read range in meters of near field transponder 104 and far field transponder 102, respectively. For example, when the center of near field transponder 104 is located 10 mm above the center and 10 mm to the right of center of far field transponder 102 on tag 100, the read range of near field transponder 104 is 4.2 m and the read range of far field transponder 102 is 11.8 m. In this regard, a RFID reader may be able to accurately read data transmitted by far field transponder 102 up to 11.8 meters and near field transponder 104 up to 4.2 meters. While a far field read range of 11.8 m may be considered sufficient, a 4.2 m near field read range would likely be considered insufficient or, more particularly, too large of a near field read range for many applications, such as security and identification applications. In some embodiments, a sufficient near field read range should preferably be about, for example, 0.1 m to 0.5 m. To compensate for manufacturing and/or other considerations, tags in accordance with some embodiments can be adapted to include an area of at least 10 mm×10 mm (four boxes square in table 120) on tag 100 that has sufficient near field and far field read ranges for the intended application of the tag.

Tables 120 and 130 show a challenge addressed by embodiments of the present invention. Among other things, the only areas inside the body of tag 100 that do not show significant coupling between far field transponder 102 and near field transponder 104 are the areas where near field transponder 104 is positioned directly above bowtie antenna 106. However, placing near field transponder 104 directly above bowtie antenna 106 can completely detune near field transponder 104, making it unreadable even at very short ranges. Even if the body of the tag 100 was made larger, and near field transponder 104 positioned outside the dash-dot-dash line of tables 120 and 130, the simulation results of tables 120 and 130 indicate a relatively large amount of coupling would occur between the near field and far field transponders. Among other things, this presents a risk of the near field transponder 104 (and/or other NF antenna) coupling with something external to tag 100, such as another smartcard, keychain fob, metal ink pen, etc.

Figure 2A:
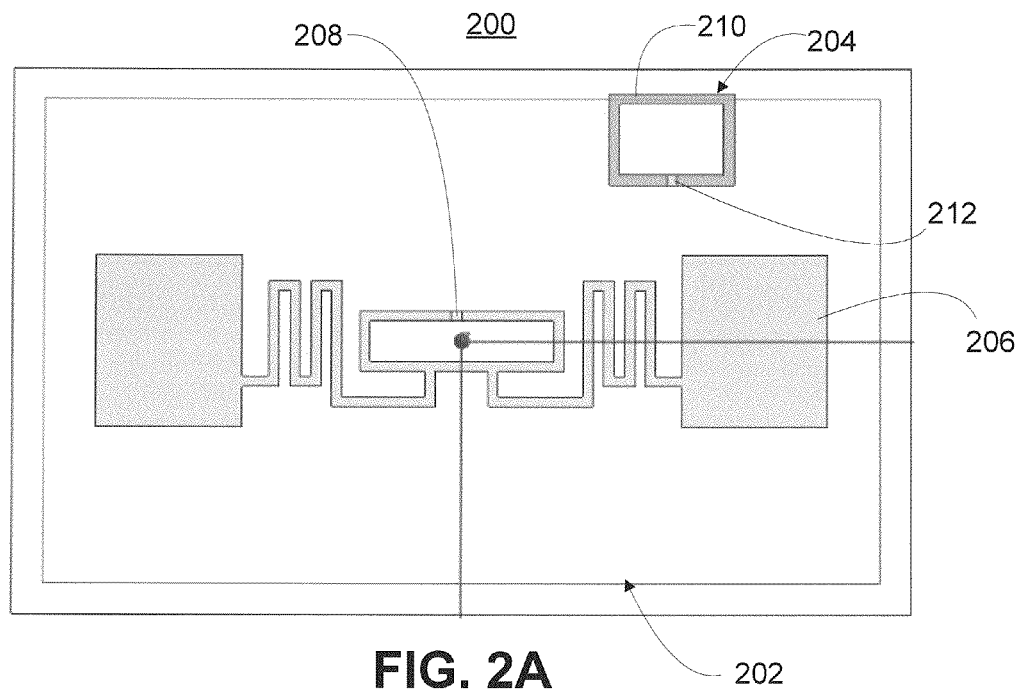

FIG. 2A shows tag 200, which includes far field transponder 202 and near field transponder 204. Far field transponder 202 includes squiggle antenna 206 and FF circuitry 208. Near field transponder 204 includes loop antenna 210 and NF circuitry 212.

Figure 2B:
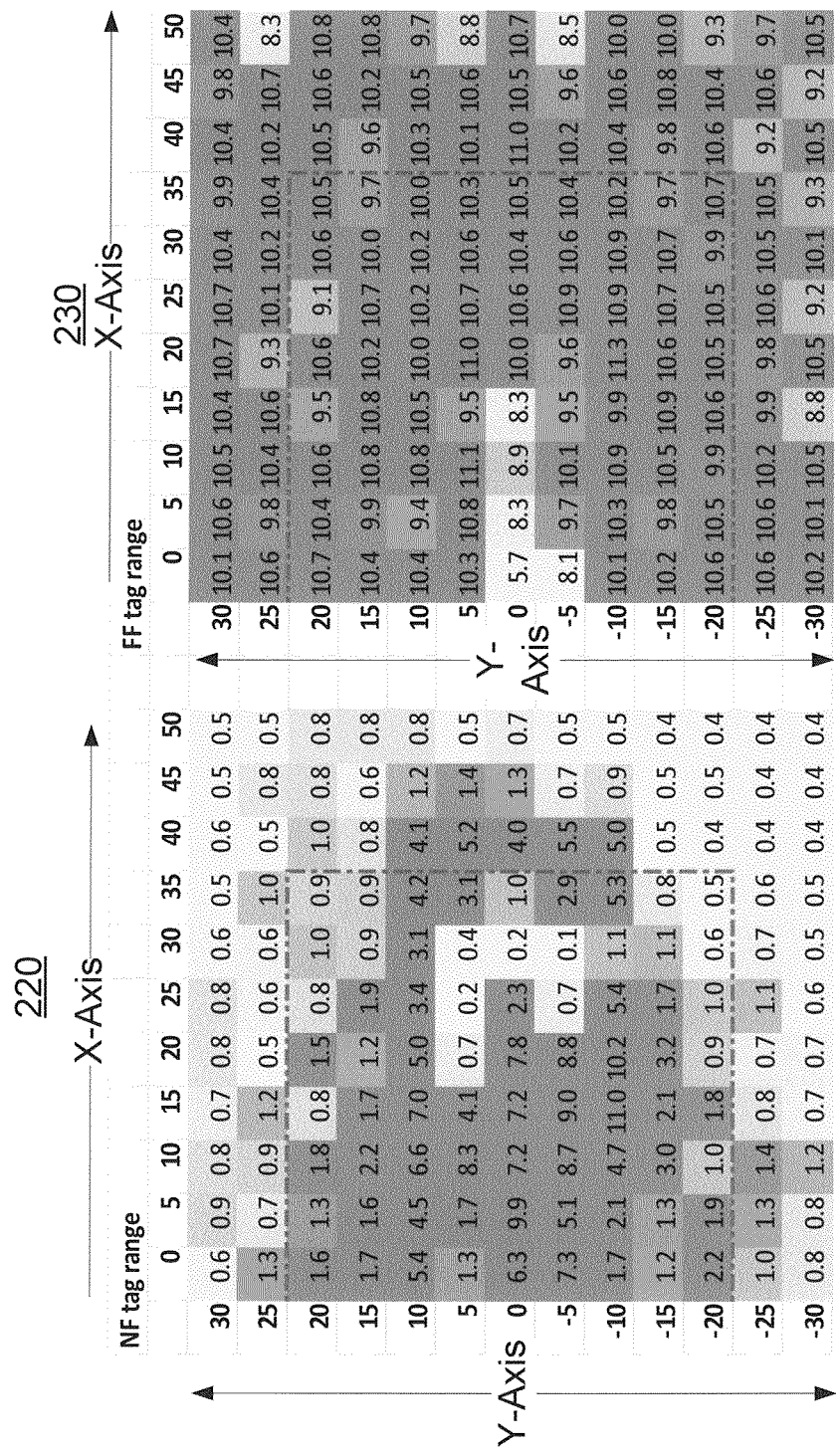

FIG. 2B shows table 220 and table 230, which are similar to tables 120 and 130 discussed above and include simulation results based on where near field transponder 204 is physically located on tag 200 relative to the location of far field transponder 202. Should tag 100 take the form factor of a CR 80 tag (known to those skilled in the art), the edge of tag 200 is shown by the dash-dot-dash line in each of tables 220 and 230. Table 220 includes simulation results associated with the read ranges of near field transponder 204. Table 230 includes simulation results associated with the read ranges of far field transponder 202.

As shown by tables 220 and 230, near field transponder 204 couples significantly with far field transponder 202, except when near field transponder 204 is positioned directly over the relatively larger, outer most conductive portions of far field transponder 202. But positioning near field transponder 204 over that part of far field transponder 202 may detune near field transponder 204, rendering it useless. Therefore, one of the most viable places to position near field transponder 204 relative to far field transponder 202, to achieve sufficient read ranges as required by some applications, is in the lower corner of tag 200. However, positioning near field transponder 204 in the corner of the card body of tag 200 could increase tag 200's vulnerability to coupling to a second smart card or other object external to the tag.

Figure 3:
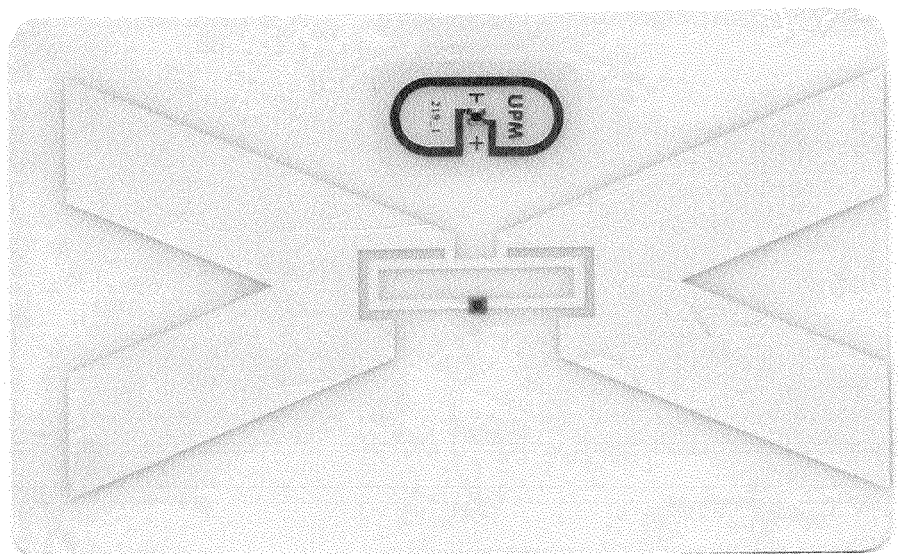
FIGS. 3 and 4 show examples of two additional dual-transponder tags and their components, including different near field transponders.
Figure 4:
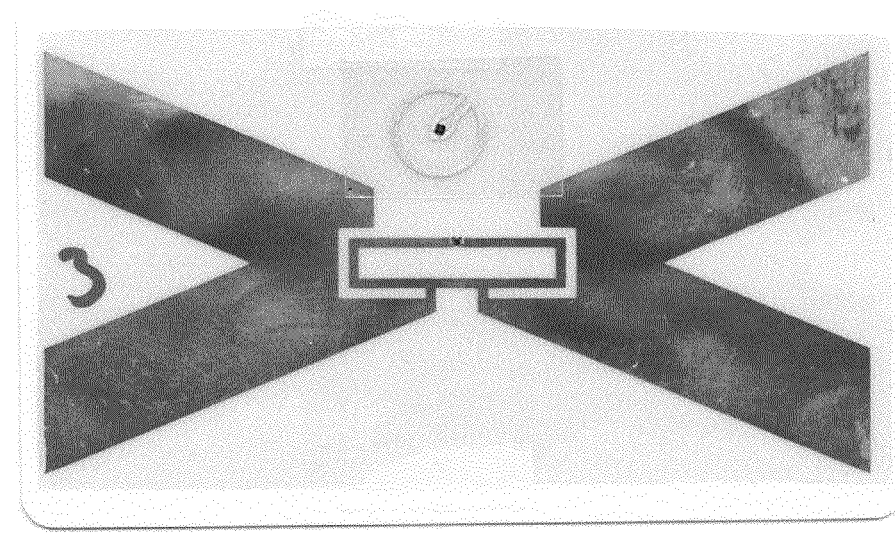

FIGS. 3 and 4 show additional examples of tags that each includes a near field transponder and a far field transponder that are likely to couple together absent utilization of embodiments of the present invention. While coupling a near field transponder with a FF antenna can have advantages for some applications, some embodiments of the present invention seek to avoid and/or reduce and, in some embodiments, effectively prevent coupling between a FF antenna and a near field transponder incorporated into the same tag, card, label or any other item that places the FF antenna within coupling range of the near field transponder. In some embodiments, because the transmissions of the two transponders do not wirelessly couple together, the near field RFID transponder can be used to authenticate the far field RFID transponder using, among other things, the user identifier ("UID") of each transponder, such as by using the example process discussed in connection with FIG. 14. The far field RFID transponder can be programmed or otherwise configured to transmit generic or publicly accessible information, while the near field RFID transponder transmits more detailed, user-specific private information. In some embodiments, both transponders on the tag can simultaneously activate and provide wireless signals based on stored RFID data. (As noted above, as referred to herein, "simultaneously" includes "near-simultaneously"). Additionally, in some embodiments, the near field and far field RFID transponders can operate in accordance with the same wireless protocol and include their own antenna and circuitry (including a processing means and/or memory known to those skilled in the art).

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIGS. 5A-8B show RFID tags that each includes a near field transponder and a far field transponder. FIGS. 5A-8B also include tables showing where the transponders can be positioned, relative to each other, on each tag such that the tag's near field transponder and the far field transponder each have a sufficient read range. Additionally, embodiments can allow the near field transponder and the far field transponder of the tag to independently utilize the same or similar wireless communications protocols (such as, e.g., anti-collision RFID protocols known to those skilled in the art) without their transmissions (e.g., independent modulation of the interrogation signal) interfering with the readability of the data of the other transponder's transmission. For example, wireless communications and interface protocols and conformance specifications known to those skilled in the art include those described in standards announced by EPCglobal Inc., such as the EPCglobal Generation 1 (Class 0, Class 0+ and Class 1) and Generation 2 (Class 1), and by ISO/IEC including the ISO/IEC 18000-Part 6c (including Amendment 1) parameters for air interface communications at 860 MHz to 960 MHz for radio frequency identification. Many such protocols and specifications can be used in accordance with some embodiments discussed herein, including, for example, other ISO/IEC 18000 parameters and protocols defined in other announced standards as well as protocols not currently described in standards. These protocols and specifications may also be used at different frequencies beyond that exemplified here at UHF frequencies. In some embodiments, even though possible configured to utilize the same protocol, both the near field transponder and far field transponder can be incorporated into a CR80 card, which is known to those skilled in the art, or other type of RFID tag (e.g., label, inlay, etc.), while reducing and, in some embodiments, effectively preventing cross coupling of the transponders.

A border crossing application is an example application for some of the tags discussed herein. A dual-transponder tag in accordance with some embodiments can be incorporated in or take the form of a government-issued passport. For example, the RFID tag's far field transponder can be read at a distance to provide an individuals' last name, while the near field transponder can be configured to provide more detailed information (e.g., home address, full name, etc.), which can all be read by the border agent systems as a secondary authentication. In some embodiments, data from both transponders can be checked against the individual's record in a secure database. A hashing or block cipher scheme could also be applied to certain or all blocks of memory of both transponders as an added layer of security and/or to assist in immediately identifying fraudulent tags.

As another example, a dual-transponder tag can be used in a vacation resort or amusement park application. In this regard, the far field transponder can be used for providing data on ride and/or park usage without requiring customer involvement. The near field transponder can be used for payments, such as in a restaurant or food court, by charging a credit card or hotel room account.

As yet another example, the near field transponder of the tag can be configured with data used to grant a user access to a building, room or other area, while the far field tag can be configured with data used to count people leaving during a fire or other type of emergency. While the far field tag may be configured to lack any user-specific information, the count of people exiting the building could be used to assist emergency crews to determine whether or not (and how many) people are still in the area.

Automobiles and other vehicles can also benefit from embodiments discussed herein. For example, an automobile's computer can be programmed by the user to, for example, turn on the air conditioning, heated seats, engine, etc., in response to receiving data from the far field transponder. But the automobile's doors may remain locked until the tag's near field transponder is detected.

Dual-transponder tags can also be used to improve document management and file systems, such as those used for medical records and legal files. A tag can be placed onto or incorporated into each paper file folder, wherein the far field transponder is encoded with generic information (e.g., client name or docket number) readable from a distance, and the near field transponder is encoded with case-specific information (such as names of people involved, upcoming deadlines, among others) readable from a smaller distance.

Figure 5A:
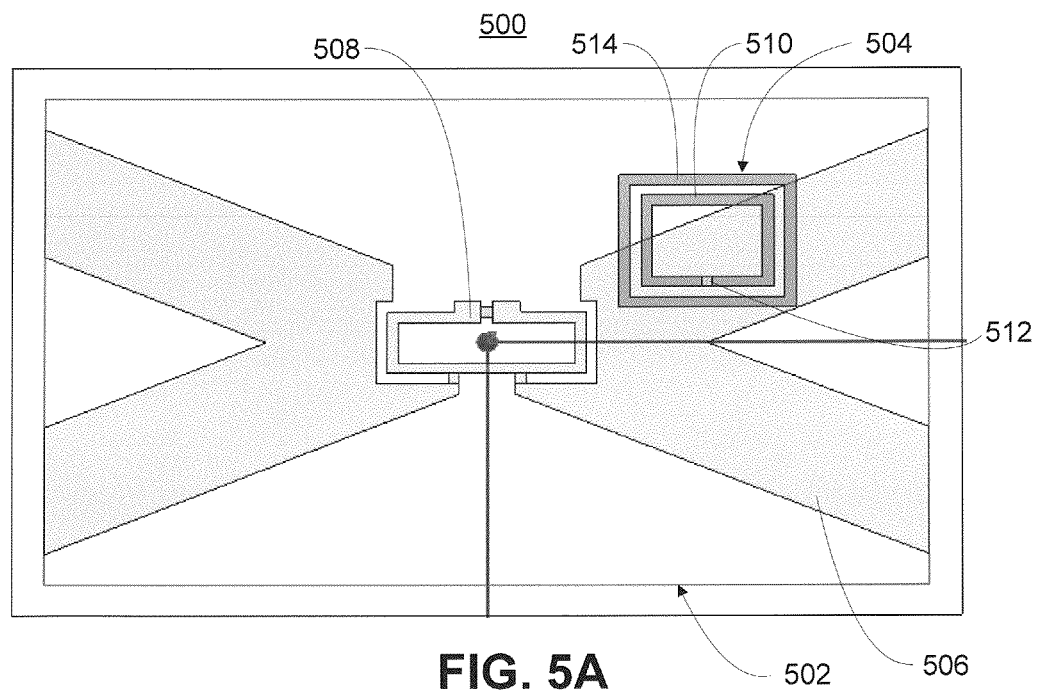
FIGS. 5A and 5B show an exemplary dual-transponder RFID tag including a bowtie FF antenna and a shielded loop NF antenna, and corresponding read range tables for each transponder included in the RFID tag in accordance with some embodiments.

FIG. 5A shows tag 500, which includes far field transponder 502 and near field transponder 504. Far field transponder 502 includes bowtie antenna 506 and FF circuitry 508. Near field transponder 504 includes shielded loop antenna 510 and NF circuitry 512. Like other circuitry discussed herein, FF circuitry 508 and NF circuitry 512 can each include, for example, any type of processing component(s), memory component(s) (including a dedicated or shared storage device), and/or any other electrical component that may facilitate storage transmission and reception of data. As noted above, "memory" refers to space on a storage device wherein data can be stored. In this regard, tag 500 may include two storage devices, with each being dedicated to a one of the transponders, or a single storage device that has memory thereon dedicated to each of the storage devices. In other embodiments, one skilled in the art would appreciate that a tag's transponders can access the same memory when discrete data bits or bytes of such memory are designated to either the far field transponder or the near field transponder.

In some embodiments, like other transponders discussed herein, far field transponder 502 can be a semi-passive transponder that has access to an independent source of power (such as a battery). Semi-passive RFID transponders, as referred to herein, are activated by a wireless source of radiation (such as an interrogation signal) and provide a modulated response. The independent source of power can be used to extend the semi-passive transponder's read range (as compared to a similar passive RFID transponder), such that the source of power is used to increase the semi-passive transponder's read range. For example, should the semi-passive transponder's battery go dead, the semi-passive transponder may still function like a passive transponder, albeit with a relatively smaller read range than when operating in a battery-assisted mode.

Shielded loop antenna 510 differs in structure as compared to loop antenna 110 or loop antenna 210 in that an additional piece of conductive material, namely shield 514, outlines or otherwise surrounds shielded loop antenna 510. Shield 514, in some embodiments, enhances the functionality of tag 500 by helping reduce and, in some embodiments, effectively prevents unwanted coupling between far field transponder 502 and near field transponder 504. In the depicted embodiments, shield 514 is shown as having electrically conductive properties. For example, shield 514 may be comprised of conductive ink, bulk metal, stamped aluminum, copper, carbon, among other electrically conductive materials.

Figure 5B:
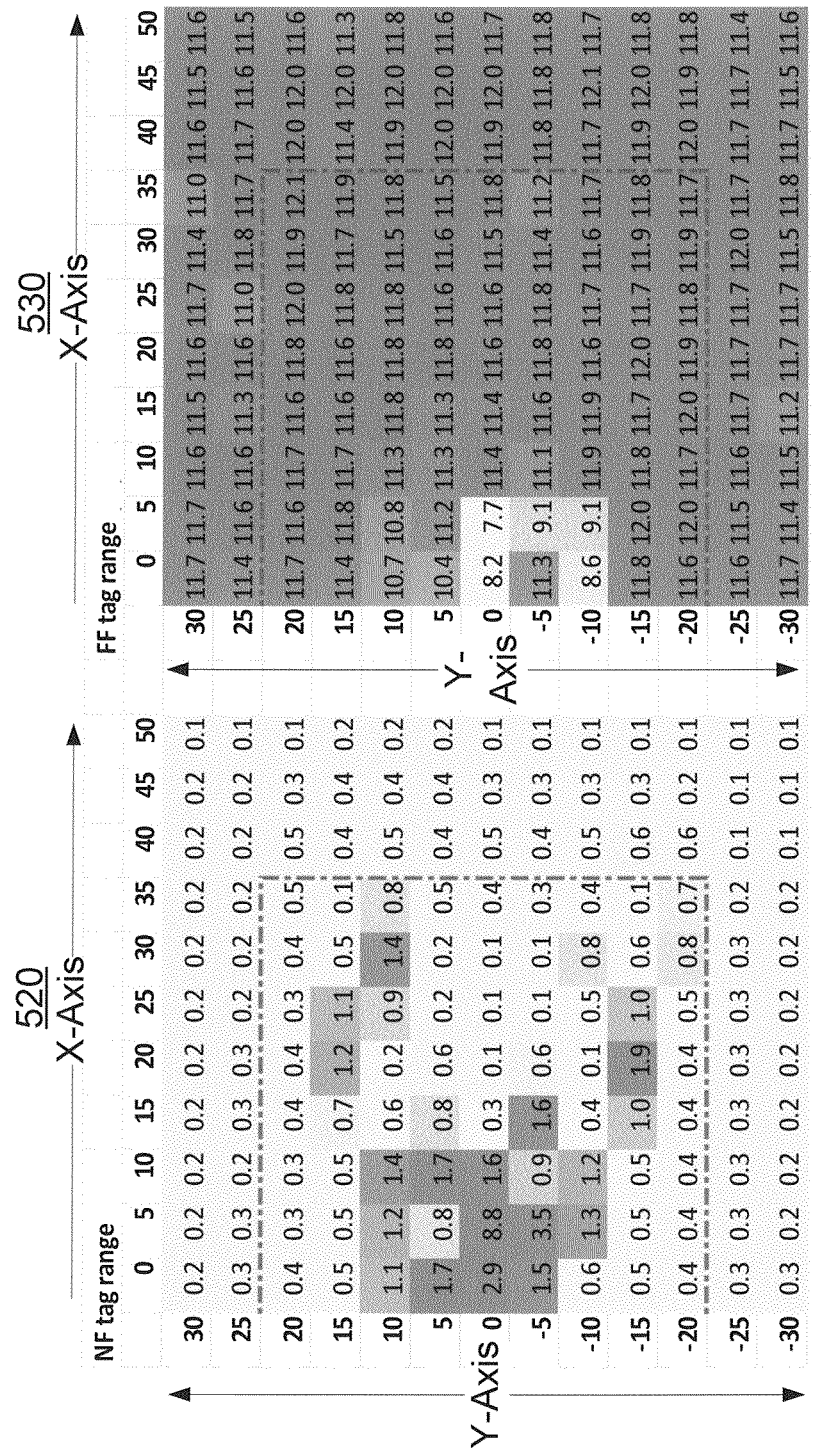

FIG. 5B shows table 520 and table 530, which are similar to tables 120 and 130 discussed above in connection with FIG. 1. Tables 520 and 530 include simulation results based on where near field transponder 504 is physically located on tag 500 relative to the location of far field transponder 502. Should tag 100 take the form factor of a CR 80 tag known to those skilled in the art, the edge of tag 500 would be located where the dash-dot-dash line is shown in each of tables 520 and 530. Table 520 includes simulation results associated with the read ranges of near field transponder 504. Table 530 includes simulation results associated with the read ranges of far field transponder 502.

As shown by tables 520 and 530, shielded loop antenna 510 of near field transponder 504 significantly reduces coupling between near field transponder 504 and far field transponder 502, except when near field transponder 504 is placed proximate to the center or the bottom of far field transponder 502. But positioning near field transponder 504 relative to the other parts of far field transponder 502, reduces and, in some embodiments, effectively prevents coupling, thereby maintaining near field transponder 504's read range to less than 1m in most locations on tag 500, while still allowing far field transponder 502 to have a read range of over 11 m in most of the possible configurations. For example, one of the most viable places to position near field transponder 504 relative to far field transponder 502, to achieve sufficient read ranges as required by some applications, is in the center-right (or left) areas of tag 500 (i.e., between 20 mm to 30 mm to the right of tag 500's center, within 5 mm up or down of the center of tag 500). Such positioning of near field transponder 504 on tag 500 would also reduce and, in some embodiments, effectively prevent any substantive increase to the risk of near field transponder 504 coupling unintentionally to a transponder on a different tag or other object in close proximity to tag 500, since those positions are away from the corner and edges of tag 500. This would also help provide a sufficient margin of error when manufacturing tag 500.

Figure 6A:
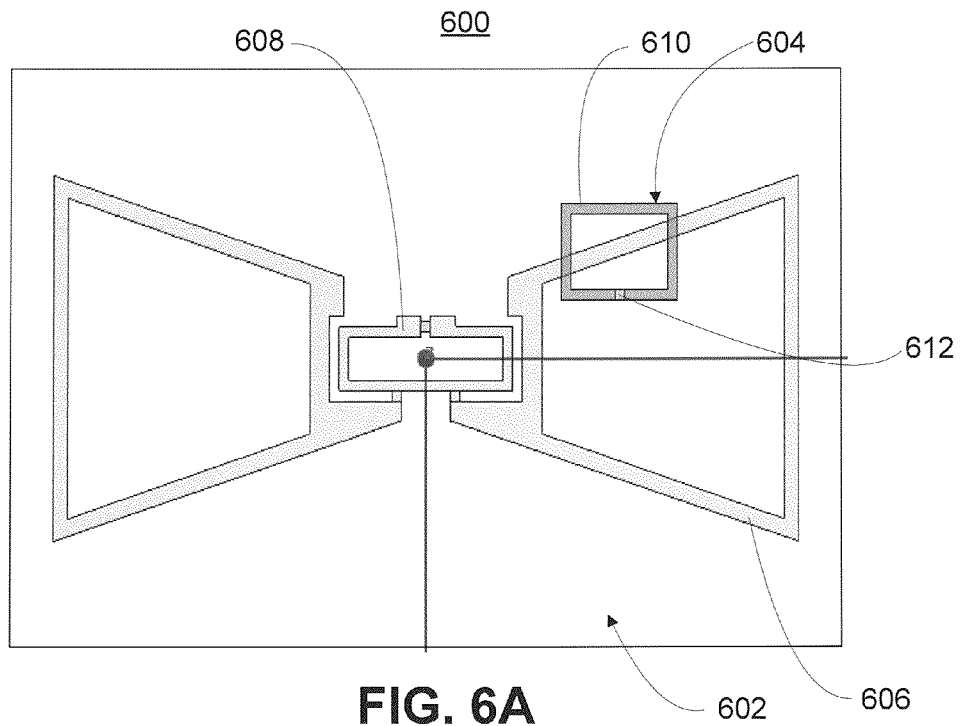
FIGS. 6A and 6B show an exemplary dual-transponder RFID tag including an open bowtie FF antenna and a loop NF antenna, and corresponding read range tables for each transponder included in the RFID tag in accordance with some embodiments.

FIG. 6A shows tag 600, which includes far field transponder 602 and near field transponder 604. Far field transponder 602 includes open-bowtie antenna 606 and FF circuitry 608. Near field transponder 604 includes loop antenna 610 and NF circuitry 612.

Open-bowtie antenna 606 differs in structure as compared to bowtie antenna 506 or bowtie antenna 106 in that the conductor used to form open-bowtie antenna 606 is depicted as a relatively thin strip of metal with interior space 616 therein. In other words, the width open-bowtie antenna 606 is small relative to the overall width of far field transponder 602. In this regard, interior space 616 may include, e.g., a dielectric, another antenna, another transponder, a conductor, a vacuum, a semi-conductor, ferrite material, any other substance, or a combination thereof. The structural adaptations of open-bowtie antenna 606, in some embodiments, enhances the functionality of tag 600 by helping reduce and, in some embodiments, effectively prevent unwanted coupling between far field transponder 602 and near field transponder 604.

Figure 6B:
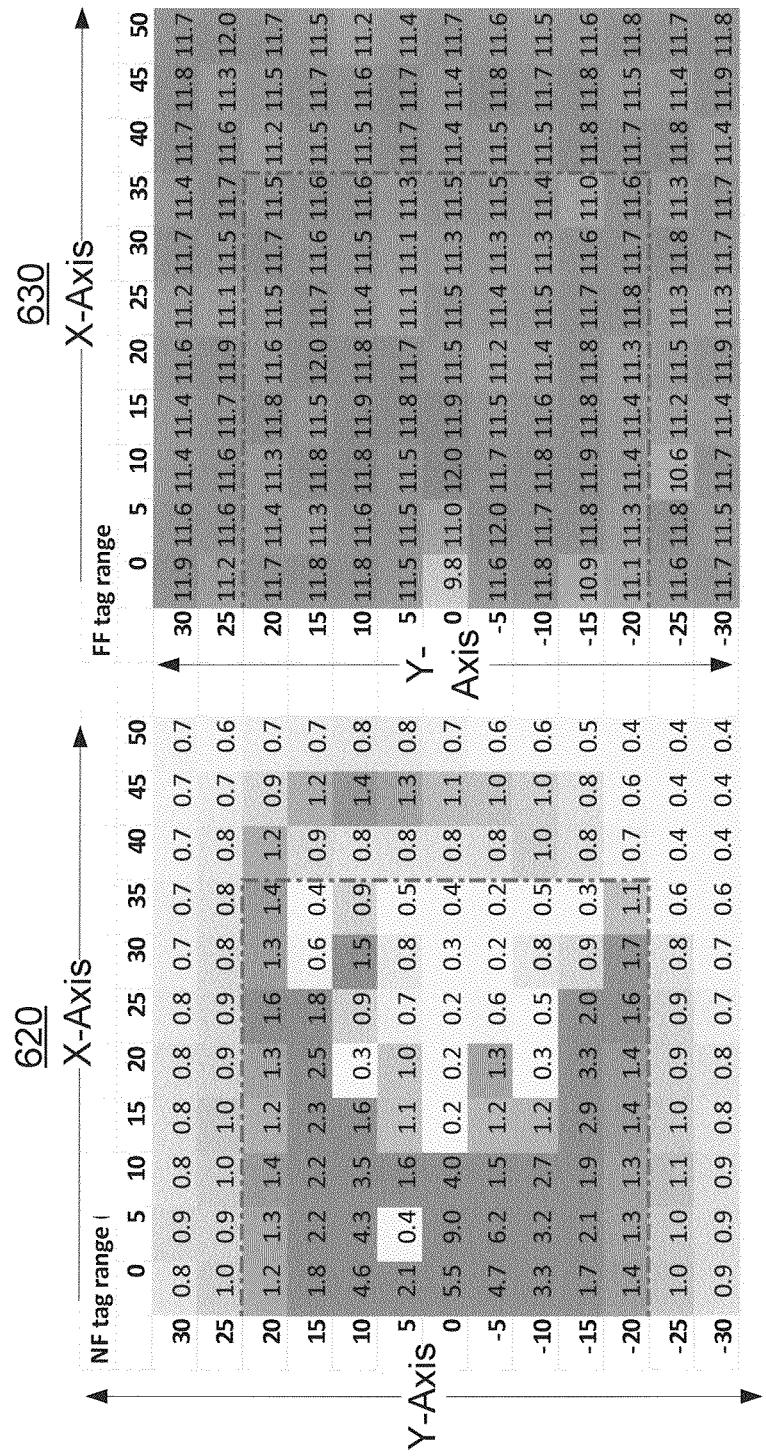

FIG. 6B shows table 620 and table 630, which are similar to tables 120 and 130 discussed above in connection with FIG. 1. Tables 620 and 630 include simulation results based on where near field transponder 604 is physically located on tag 600 relative to the location of far field transponder 602. Should tag 100 take the form factor of a CR 80 tag known to those skilled in the art, the edge of tag 600 is shown by the dash-dot-dash line in each of tables 620 and 630. Table 620 includes simulation results associated with the read ranges of near field transponder 604. Table 630 includes simulation results associated with the read ranges of far field transponder 602.

As shown by tables 620 and 630, open-bowtie antenna 606 of far field transponder 602 significantly reduces coupling between the near field transponder 604 and far field transponder 602, when the near field transponder 604 is positioned within interior space 616 of open-bowtie antenna 606. For example, far field transponder 602 has a simulated read range of over 11 m, regardless of where near field transponder 604 is positioned within interior space 616. As used herein, being positioned within interior space 616 includes, for example, being positioned within the same plane as open-bowtie antenna 606, being positioned in a plane above open-bowtie antenna 606 (e.g., a plane about 50 microns above open-bowtie antenna 606), being positioned in a plane below open-bowtie antenna 606, being positioned in a plane that is included in that of open-bowtie antenna 606 (e.g., if near field transponder 604 is thinner than open-bowtie antenna 606), being positioned in a plane that is inclusive of open-bowtie antenna 606 (e.g., if near field transponder 604 is thicker than open-bowtie antenna 606), being included in a plane that intersects that of open-bowtie antenna 606, or a combination thereof. Because those positions are also away from the corner and edges of tag 600, such positioning of near field transponder 604 on tag 600 would also reduce and, in some embodiments, effectively prevent any substantive increase in the chance of near field transponder 604 unintentionally coupling to a second tag's transponder or other object in close proximity to tag 600, and likely provide sufficient margin of error when manufacturing tag 600.

Figure 7A:
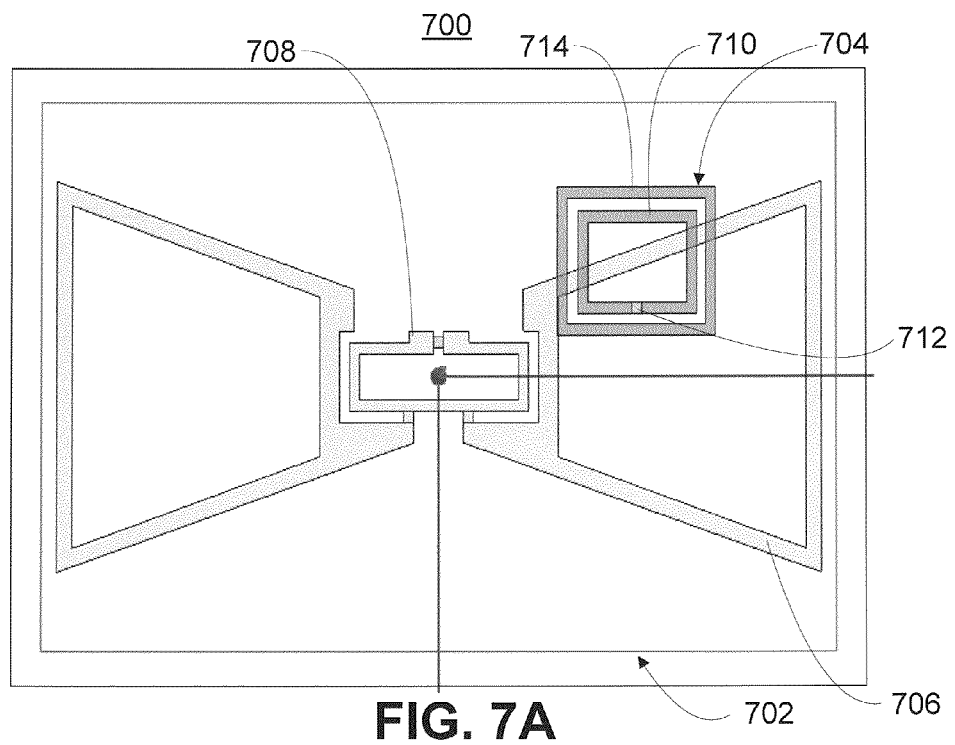
FIGS. 7A and 7B show an exemplary dual-transponder RFID tag including an open bowtie FF antenna and a shielded loop NF antenna, and corresponding read range tables for each transponder included in the RFID tag in accordance with some embodiments.

FIG. 7A shows tag 700, which includes far field transponder 702 and near field transponder 704. Far field transponder 702 includes open-bowtie antenna 706 and FF circuitry 708. Near field transponder 704 includes shielded loop antenna 710 and NF circuitry 712. As such, tag 700 includes a combination of components similar to or the same as near field transponder 504 of tag 500 and far field transponder 602 of tag 600. Near field transponder 704 can be positioned relative to far field transponder 702 the same as or similar to the relative positioning of near field transponder 604 and far field transponder 602 discussed above.

Figure 7B:
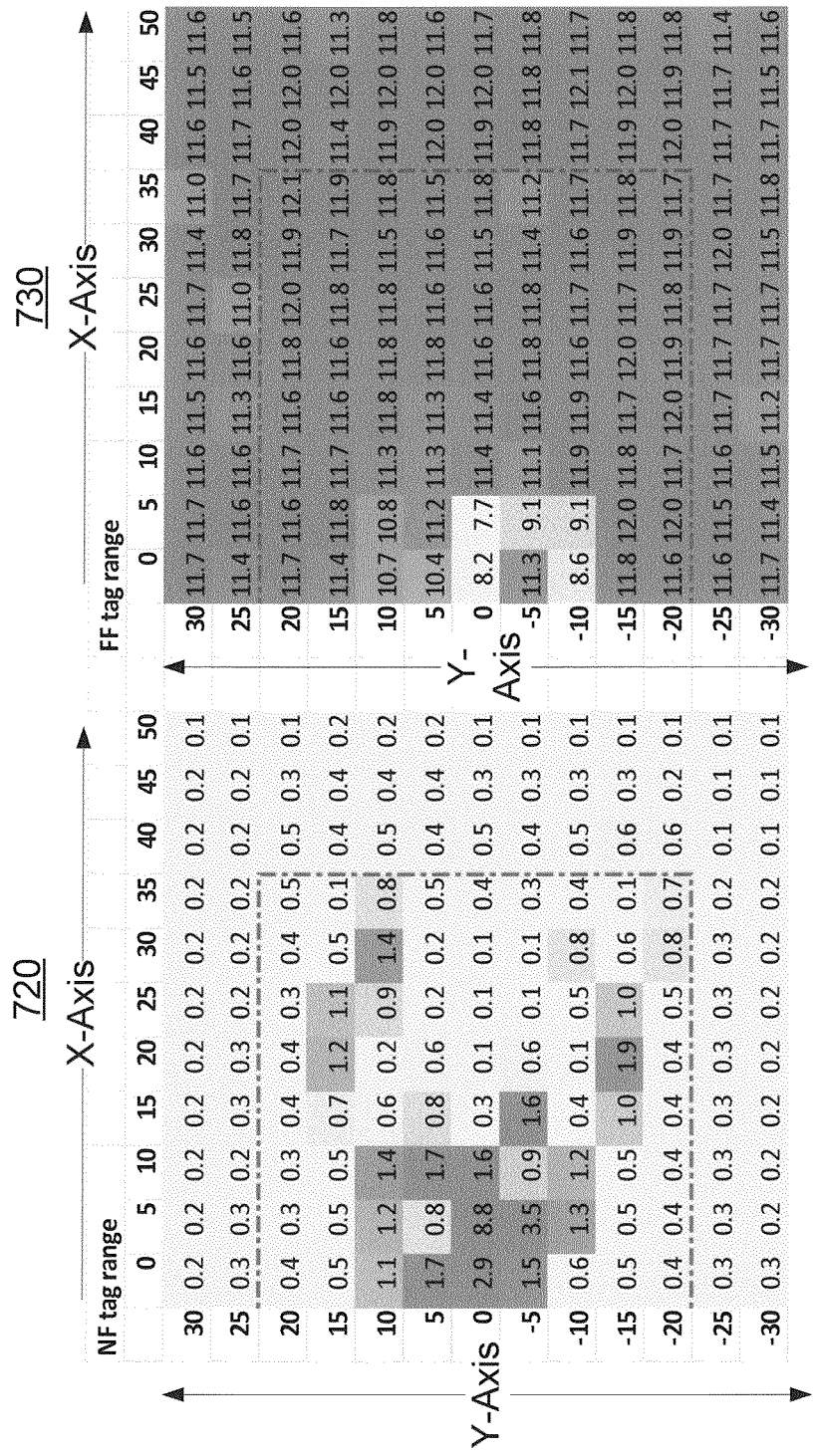

The combination of structural elements and other adaptations incorporated into near field transponder 704 and far field transponder 702 can help further reduce and, in some embodiments, effectively prevent coupling between the transponders as shown in FIG. 7B. Table 720 and table 730 are similar to tables 120 and 130 discussed above in connection with FIG. 1.

As shown by tables 720 and 730, the combination of open-bowtie antenna 706 and shielded loop antenna 710 can significantly reduce coupling between near field transponder 704 and far field transponder 702 in most places on tag 700. Because coupling can be avoided when near field transponder 704 is located at a number of places on tag 700, tag 700 can be configured to reduce and, in some embodiments, effectively prevent undesired coupling between tag 700 and transponder(s) of an adjacent tag (e.g., a card positioned upstream or downstream on the manufacturing, printing and/or other type of processing path). Accordingly, various embodiments of the invention may allow for tightly packing of adjacent tags thereby improving encoding and printing efficiency.

Additionally, the combination of open-bowtie antenna 706 and shielded loop antenna 710 will likely provide a sufficient margin of error when manufacturing tag 700. As show in tables 720 and 730, there is an area of about 225 mm2 (namely, between 25 mm and 35 mm on the X-axis and between −5 and 5 on the Y-axis) where near field transponder 704 may be placed while still maintaining a relatively small NF range (e.g., less than 0.5 m) and a relatively large FF range (e.g., more than 11 m).

Figure 8A:
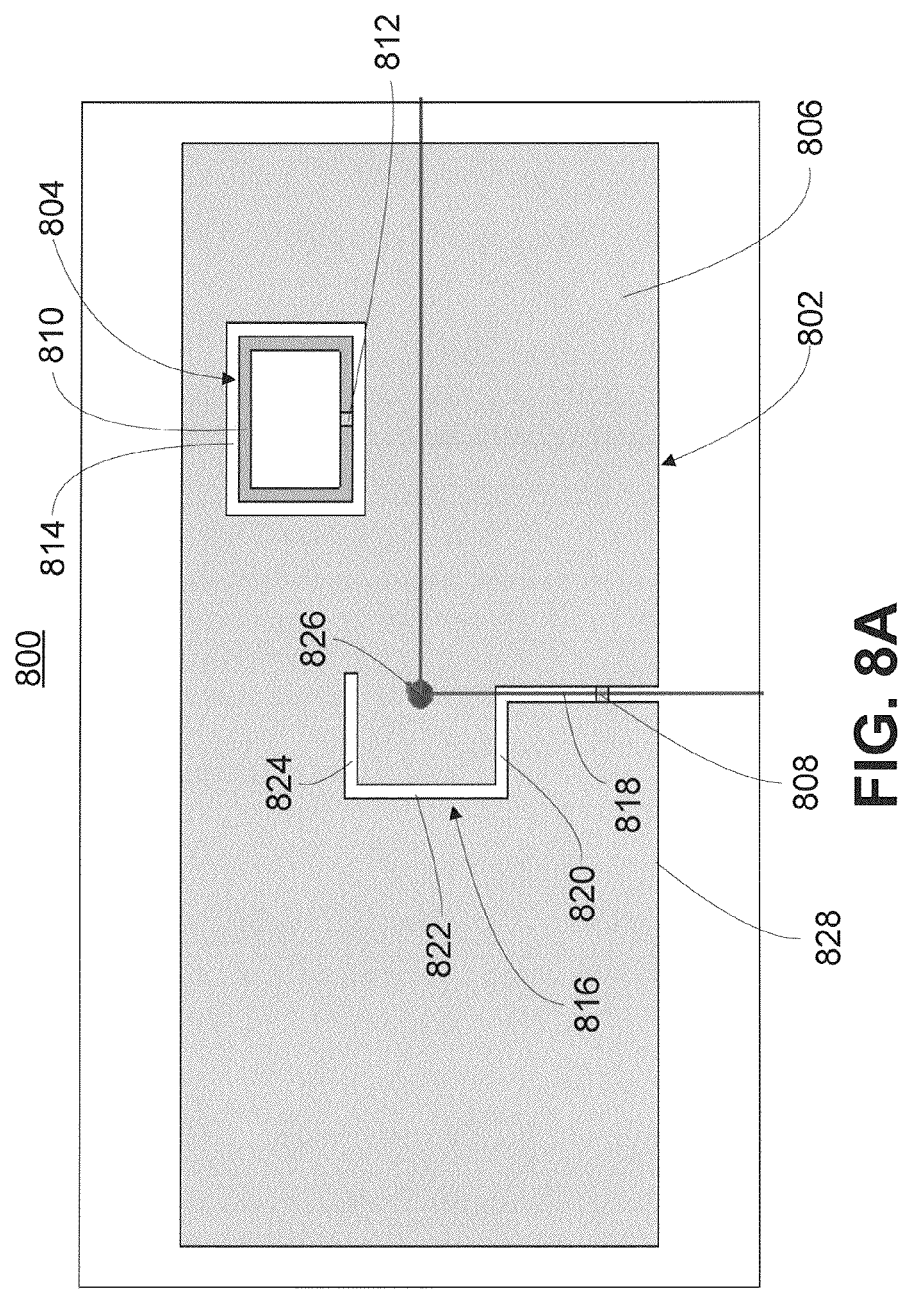
FIGS. 8A and 8B show an exemplary dual-transponder RFID tag including a slot FF antenna and a loop NF antenna, and corresponding read range tables for each transponder included in the RFID tag in accordance with some embodiments.

FIG. 8A shows tag 800, which includes far field transponder 802 and near field transponder 804. Far field transponder 802 includes slot antenna 806 and FF circuitry 808. Near field transponder 804 includes loop antenna 810 and NF circuitry 812. Like the other antennas discussed herein, slot antenna 806 and loop antenna 810 can comprise any type of suitable material, including any type of metal or other material that is able to conduct electricity and/or radiate energy. Similar to or the same as the other components discussed herein, slot antenna 806 and/or loop antenna 810 can be printed, etched, glued, and/or otherwise formed using any suitable method.

Slot antenna 806 can include nonconductive space 814. Nonconductive space 814 can be incorporated into slot antenna 806 after slot antenna 806 is fashioned (e.g., by removing, cutting, etc. a section of slot antenna 806) and/or included in slot antenna 806 by any other means (such as, e.g., leaving a void when creating slot antenna 806). Near field transponder 804 can be positioned within nonconductive space 814. Nonconductive space 814 can be any size and can be adapted to be receive loop antenna 810, or another NF antenna, while being adapted such that loop antenna 810 does not contact a conductive portion of slot antenna 806. For example, nonconductive space 814 can be 101%-110% the size of near field transponder 804 or any other near field transponder nonconductive space 814 is adapted to receive.

Slot antenna 806 can also include slot 816, which may be a separate nonconductive space that is separate from nonconductive space 814. Slot 816 can include one or more portions, namely portions 818, 820, 822 and 824 that extend perpendicular to each other and past center point 826. As referred to herein, perpendicular includes a 90 degree angle plus or minus 5 degrees unless specified otherwise. Center point 826 is the center of slot antenna 806.

For example, portion 818 can extend perpendicular from edge 828 of slot antenna 806 towards center point 826. FF circuitry 808 can at least partially bridge portion 818. Prior to reaching center point 826, portion 818 may end and portion 820 may begin. Portion 820 may extend perpendicular to portion 818 in a direction generally away from nonconductive space 814. In some embodiments, portion 820 may be shorter than portion 818 as shown in FIG. 8A. In other embodiments (not shown), portion 820 may be the same length or longer than portion 818. Portion 820 may end and portion 822 may begin. Portion 822 may extend perpendicular to portion 820 away from edge 828. Portion 822 may be approximately the same length as portion 818 (e.g., within three millimeters). In some embodiments, portion 822 may be shorter or longer than portion 818. Portion 822 may also extend past center portion 826. Portion 822 may end and portion 824 may begin. Portion 824 may extend perpendicular to portion 822, generally parallel to edge 828 and towards nonconductive space 814. Portion 824 may be approximately the same length as portion 820 (e.g., within three millimeters). In some embodiments, portion 824 may be shorter or longer than portion 820. As such, slot 816 can be configured to form a hook shape that hooks away from near field transponder 804. In other embodiments (not shown), slot 816 can hook towards near field transponder 804 (e.g., portion 822 may be on the other side of center point 826).

In some embodiments, the width of slot 816 can be consistent as shown in FIG. 8A. In other embodiments, the width of slot 816 can vary. For example, the width of each portion of slot 816 may be independent of the width of one or more other portions. As another example, the width of one or more of the portions of slot 816 can vary therewithin. Additionally or alternatively, one or more of the intersections of the various portions need not be perpendicular, but may be any other angle and/or rounded (instead of squared as shown in FIG. 8A).

Figure 8B:
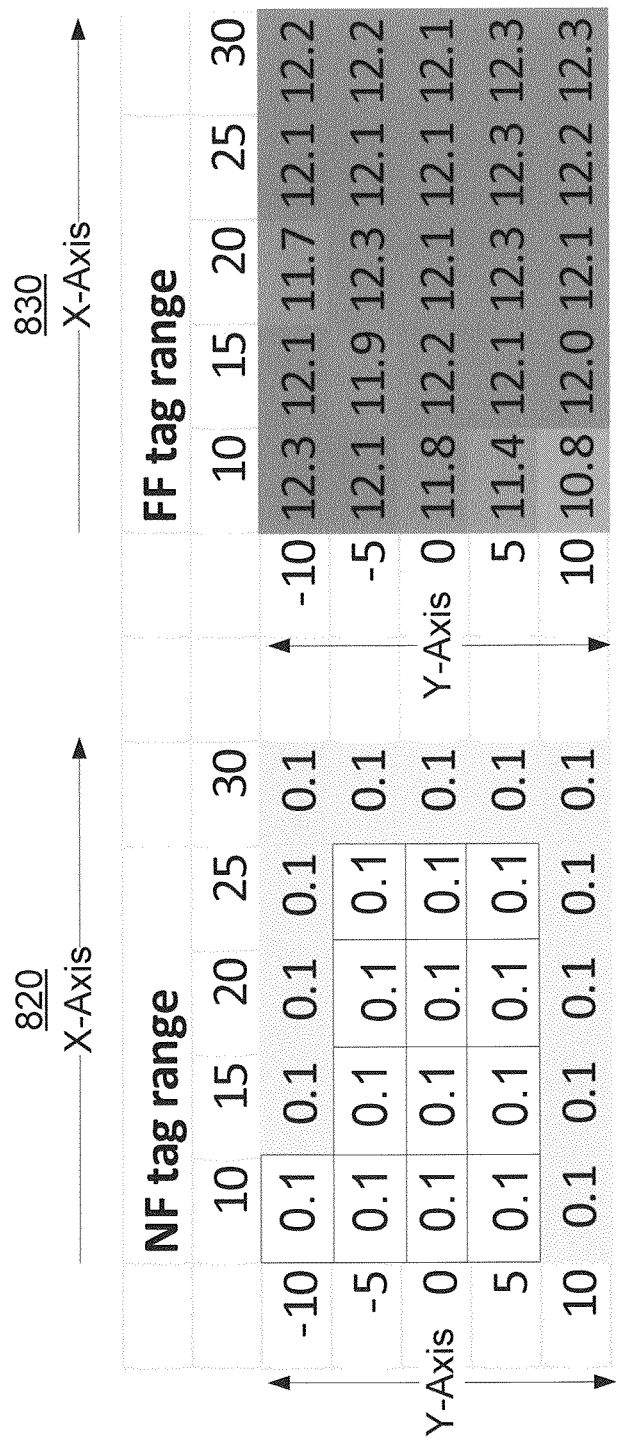

As such, tag 800 is configured to help reduce and, in some embodiments, effectively prevent coupling between the transponders as shown in FIG. 8B. Table 820 and table 830 show simulation results for the read ranges of different configurations of tag 800, and are similar to tables 120 and 130 discussed above in connection with FIG. 1.

As shown by tables 820 and 830, nonconductive space 814 can be incorporated anywhere within slot antenna 806 (except the center of tag 800, where FF circuitry 808 is located). Near field transponder 804 can then be positioned within nonconductive space 814 to create a dual-transponder tag, wherein near field transponder 804 functions independent from and does not couple with far field transponder 802 like other tags discussed herein. Because coupling can be substantially avoided and as effectively prevented when near field transponder 804 is located at a number of places on tag 800, tag 800 can be configured to reduce and, in some embodiments, effectively prevent any substantive increase (as compared to single-transponder tags) in near field transponder 804's chance of unintentionally coupling to a second smart card or other object in close proximity to tag 800. Also provided is a sufficient margin of error for positioning the components of tag 800 during manufacturing.

The tags discussed above as well as others in accordance with embodiments of the present invention can be used to improve on existing systems, implement novel processes and perform in accordance with various embodiments of the present invention. According to some exemplary aspects of embodiments, a processor included within the circuitry of each transponder may operate under control of instructions and/or other code received from a computer program product. For example, each transponder's memory can be configured to store firmware, one or more application programs, and/or other software that is executed by the transponder's processor to control the operation of the transponder. Additionally, the code stored on the computer program product could be transferred to, for example, the transponders of a tag using a printer-encoder, which may include an array coupler, such as those discussed in commonly-assigned U.S. patent application Ser. No. 12/618,107, filed Nov. 13, 2009 and titled "Encoding Module, Associated Encoding Element, Connector, Printer-Encoder and Access Control System", which was hereby incorporated by reference in its entirety. An example printer encoder is also discussed in connection with FIG. 17.

Because the array coupler can be configured to target transponders positioned in various locations on a tag, such an encoding system can be configured to identify and/or store position information for each transponder relative to the tag's boundaries and/or the other transponder(s) on the tag. Without identifying the tag's location, storing position information, and/or otherwise being configured to distinguish the near field transponder from the far field transponder, the encoder risks programming the NF data onto the far field transponder and vice-versa.

Although the array coupler and/or other type(s) of encoders can be configured to target transponders positioned in various locations on a tag, a traditional single coupler encoding system can also be configured to identify the near field transponder and/or the far field transponder. Likewise, an encoding system having an array coupler can also be configured to use other means to target transponders for encoding. For example, a coupler encoder can be preprogrammed with NF data (such as e.g., the near field transponder's UID) and/or FF data (such as the far field transponder's UID). The NF and FF data can be encoded or otherwise stored during tag manufacture and subsequently used to target each transponder that passes through the encoder. As such, this may require a list of related NF and FF data (such as, e.g., UIDs that are associated with the same RFID tag) to be provided for each pair of transponders associated with an RFID tag. In some instances, the creation of the list might pose an unnecessary security risk (since it associates the far field UID with the near field UID), but in others (examples of which are discussed herein) the security risk may be lessoned due to additional layers of security being used.

Another approach for identifying each transponder during the encoding process may include encoding an identifying header to each transponder's memory (e.g., to the EPC or user memory spaces) during manufacturing. The identifying header could be read when encoding each transponder and used by the coupler to identify and distinguish the near field and far field transponders. After encoding, the identifying header data can be erased by the encoder. If required by the authentication scheme planned for the tag, the UID pair and/or data being encoded onto the tag could be recorded during encoding as well. In this regard, the associated UIDs and/or other data are only known once the card is issued, and only by the issuing organization.

Once the tag's storage device(s) are programmed by a printer-encoder or other type of device, the programmed code can direct the performance of one or more functions of each transponder's processor included in the tag. The tag's storage device(s) can be a non-transitory computer-readable storage medium (as opposed to an electromagnetic signal or other type of transmission medium). For example, the computer readable storage medium can comprise a non-volatile storage medium that includes software or other type of computer-readable program code portions, such that a series of computer instructions are embodied in the non-transitory computer-readable storage medium of each transponder. In this regard, a far field transponder and/or near field transponder can store a memory address or other type of pointer information used to access data about the other transponder on the RFID tag, thereby allowing a RFID reader or other device to quickly validate the RFID tag. As such, the tag can be considered an article of manufacture that can be produced and includes the computer readable code portions on a non-transitory computer readable storage medium.

Each tag can also include visible human readable or machine readable printed information, such as a bar code, person's picture, or other identifying information. In some embodiments, the human and/or machine readable information is printed onto the card.

As will be appreciated, a machine is also produced by loading computer program code onto the circuitry of the tag, RFID reader and/or, other device. As such, the code portions that execute on the tag, RFID reader, or other programmable apparatus create means for implementing the functions described herein. The computer program instructions may also be loaded onto a computer or other programmable apparatus, such as an RFID tag and/or RFID reader, to cause a series of operational steps, including those described in connection with, e.g., FIG. 9, to be performed on the computer or other programmable apparatus to produce a computer-implemented process.

Figure 9:
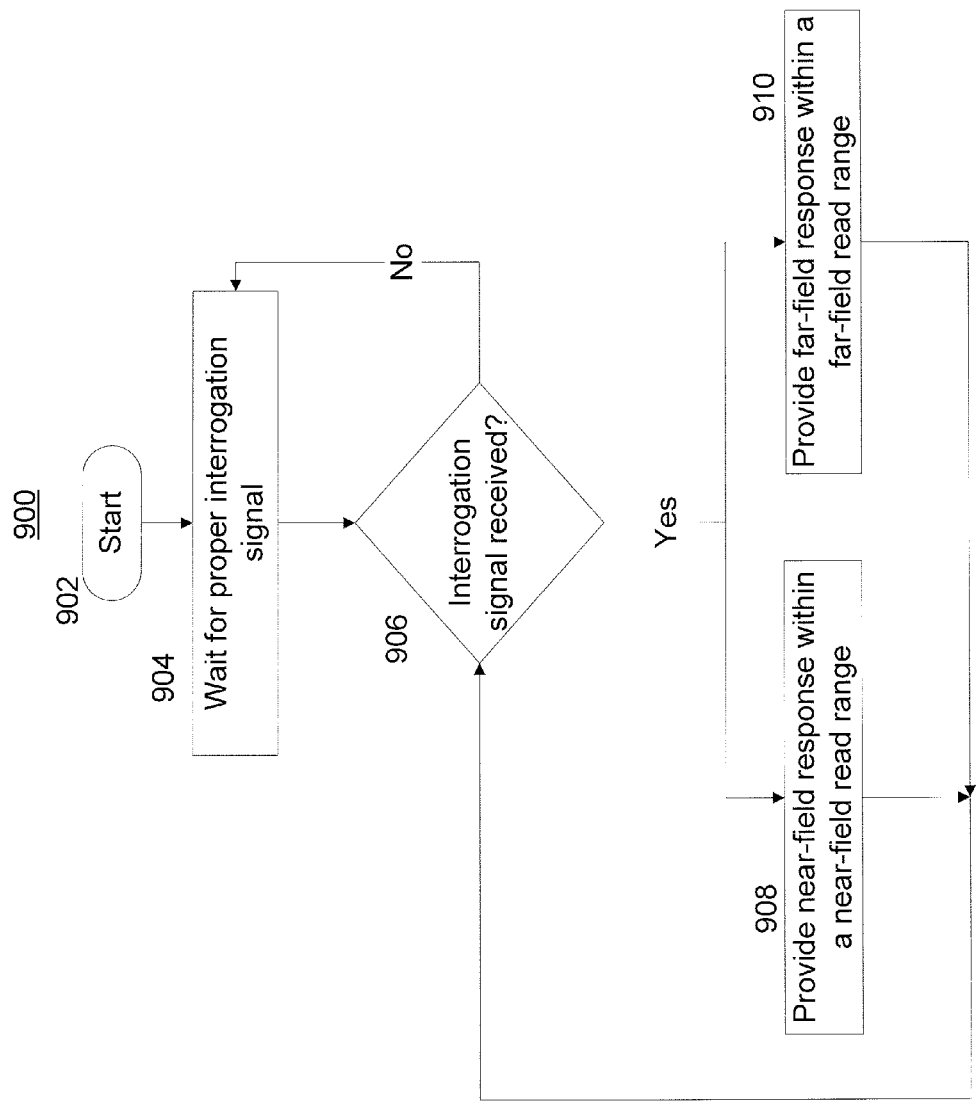
FIG. 9 shows a machine-implemented process that can be employed by circuitry of a dual-transponder tag in accordance with some embodiments.

FIG. 9 shows process 900 as an example of functionality implemented by the circuitry of a dual-transponder RFID tag that includes two UHF transponders that are both configured to operate simultaneously (or near simultaneously) without wirelessly coupling together, despite being incorporated into the same tag and using the same wireless RFID protocol. Process 900 starts at 902.

At 904, the transponders wait for an interrogation signal. In some embodiments, the interrogation signal can provide the transponders the wireless power necessary for the RFID tag's processor(s) to function and begin sending a backscatter data signal derived from the data stored on the tag's respective memory component(s). In other embodiments, such as when at least one of the transponders is active and has an independent power source (such as a battery), the interrogation signal may still act as a triggering event that causes the active transponder(s) to respond accordingly. As long as no interrogation signal has been received at 906, each transponder of the tag continues to wait for the proper interrogation signal at 904. For example, a transponder can be configured to respond to an interrogation signal that complies with a standard, such as those set by the International Organization for Standardization ("ISO").

A proper interrogation signal can be, for example, any signal sent at a predetermined frequency, using a predetermined frequency hopping protocol, among other things, that the transponders are configured to detect and respond to and/or any signal detected at a given power level. In this regard, the interrogation signal can be transmitted at a frequency between 860-960 MHz, using a frequency hopping spread spectrum technique or "listens before talk" technique. In some embodiments, more advanced handshaking may be required (involving, e.g., UID of the RFID reader, etc.) to determine whether the interrogation signal is properly associated with one or more of the tag's transponders. Interrogation signals can be generated continuously, periodically, and/or in response to detecting a stimulus (such as a sensor detecting the presence of a card in an interrogation zone).

In response to determining at 906 that the received interrogation signal is proper based on the tag's configuration, one or more of the transponders in the tag may begin sending respective response signals (e.g., modulating the interrogation signal based on the stored RFID data). For example, a far field transponder and a near field transponder may simultaneously begin modulating the interrogation signal to transmit the backscattered data at 908 and 910 in response to receiving the interrogation signal at 906. In this regard, the far field transponder may include different data than the near field transponder and, as a result, provide a different backscatter signal.

In yet other embodiments, some active transponders may begin transmitting a signal in response to a local tag-generated trigger event, absent the tag receiving an interrogation signal. For example, active and semi-active transponders can include a timer, user button, environmental sensor (e.g., motion sensor, including a velocity, acceleration and/or vibration sensor, gas detection sensor, biological detection sensor, humidity sensor, thermometer, light detecting sensor, RF signal detecting sensor, radioactivity sensor, pathogen detection sensor, inclinometer, magnetic field strength sensor, attachment/detachment of the tag sensor, among others and/or combinations thereof), or other component that awakens the transponder.

In such embodiments, the interrogation signal may not be necessary for process 900 to proceed to 908 and/or 910. Each transponder of the RFID tag can be configured to operate in one or more exemplary modes, namely a passive response mode (whereby the transponder remain OFF until an interrogation signal is received), an active response mode (whereby the transponder remains ON and responds only to receiving an interrogation signal), and an active generation mode (whereby the transponder can self-initiate a RFID signal broadcast).

Although not shown in the drawings, one skilled in the art would appreciate that different triggering events may cause the near field transponder to begin transmitting at 908 or the far field transponder to begin transmitting at 910. For example, one of the near field transponder or the far field transponder can be configured to transmit data in response to interrogation signals having, e.g., different frequencies (or different ranges of frequencies), in response to different interrogation signal strength thresholds, and/or in response to receiving or detecting any other characteristic or combination of characteristics associated with the interrogation or other type of signal(s) (including internally generated signals).

Figure 10A:
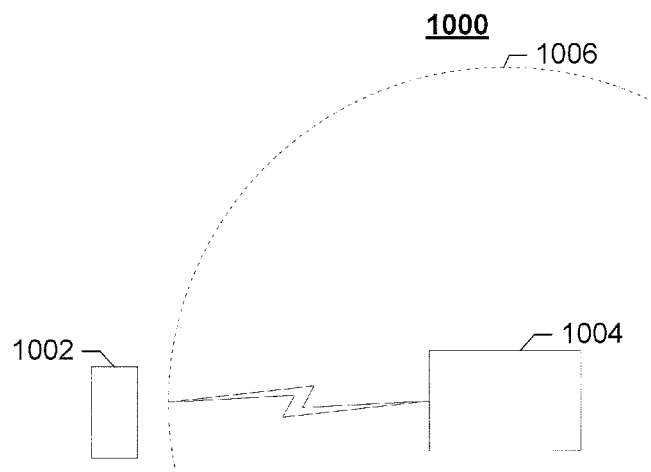
FIGS. 10A-10D show read range illustrations of a dual-transponder tag and an example of a single RFID reader system in accordance with some embodiments.

FIGS. 10A-10D show a system, namely system 1000, implementing some embodiments of process 900. For example, tag 1002 can be a dual-transponder tag, including a near field transponder and a far field transponder, configured to reduce and, in some embodiments, effectively prevent coupling between the transponders. Examples of such tags are discussed above. RFID reader 1004, which is discussed in more detail in connection with FIG. 12, can transmit an interrogation signal. Although the signal strength may taper off in a non-uniform manner as a function of distance and other variables, interrogation range 1006 is shown as having a uniform radius to avoid overcomplicating the drawings. While tag 1002 is outside interrogation range 1006, the transponders of tag 1002 can remain in a standby, ready or other non-transmitting mode as shown in FIG. 10A.

Figure 10B:
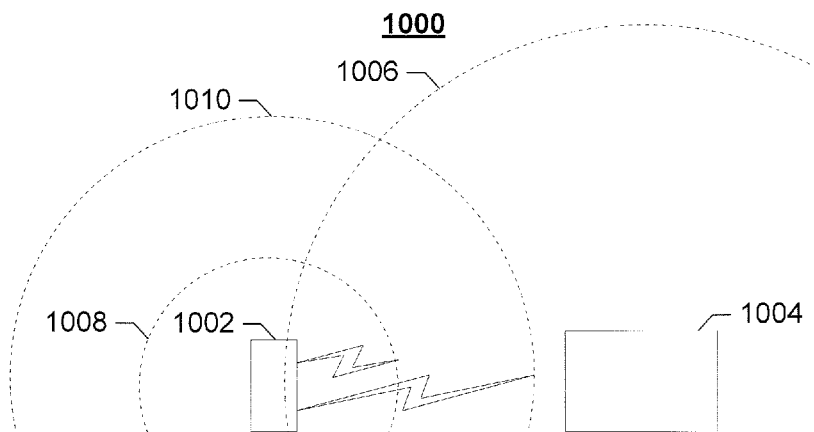

FIG. 10B shows an exemplary reaction that tag 1002 can be configured to have in response to entering interrogation range 1006. Upon the transponders of tag 1002 being properly interrogated, both the near field and far field transponders can be activated. For example, the near field transponder can modulate the interrogation signal within NF range 1008. Far field transponder can modulate the interrogation signal within FF range 1010. Although the read ranges of the transponders are not necessarily shown to scale, FIG. 10B illustrates NF range 1008 was being smaller than FF range 1010, and interrogation range 1006 of RFID reader 1004 is shown as being larger than FF range 1010. Examples of the ranges in meters for NF range 1008 and FF range 1010 are discussed above and can be related to, among other things, how the transponders are positioned on tag 1002.

Figure 10C:
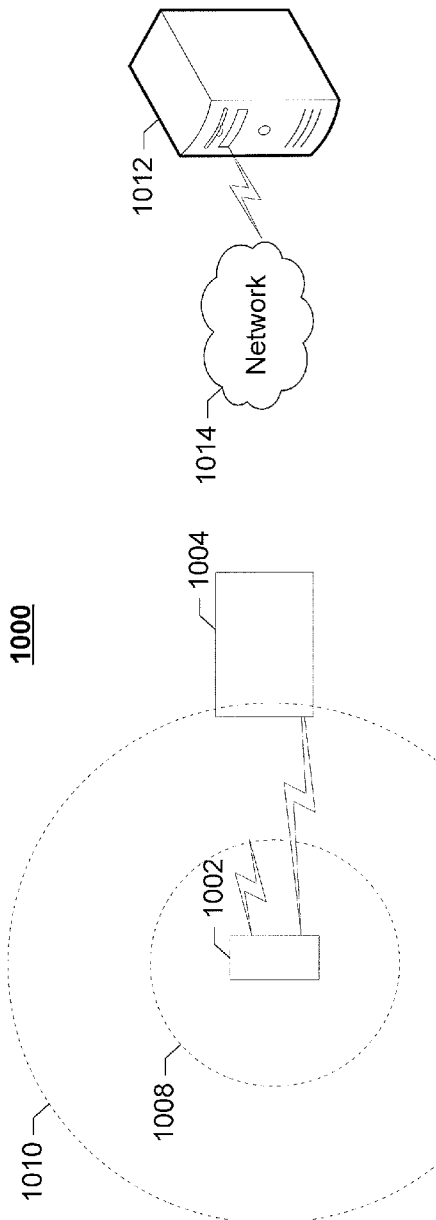
Figure 10D:
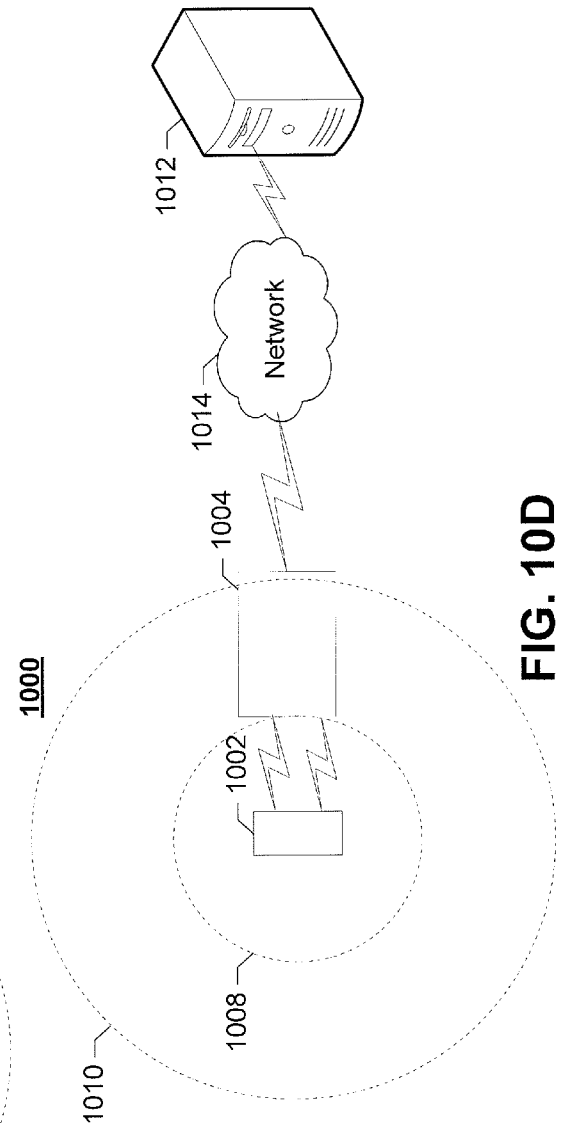

FIG. 10C shows tag 1002 after it has moved physically closer to RFID reader 1004, such that RFID reader 1004 is within FF range 1010. As result RFID reader 1004 can begin receiving the data being transmitted by tag 1002's far field transponder. If RFID reader 1004 or similar device was being used by an unauthorized third party, such a third party would still need to get physically closer (e.g., within NF range 1008) to tag 1002 to be able to read the data being transmitted within NF range 1008. As a result, in most instances, the third party would be unable to read all data transmitted by tag 1002 from a remote distance (e.g., over 1 meter).

In some embodiments, examples of which are discussed herein, RFID reader 1004 can be configured to decrypt the data even while offline and/or without communicating with a network device (e.g., network database, server, etc.). In other embodiments, examples of which are discussed herein, the data stored in the one or more storage devices of tag 1002 can be encrypted and/or require remote device 1012 to decrypt.

Although FIG. 10C shows RFID reader 1004 not communicating with network 1014 (e.g., remaining "offline") even after receiving a data signal (e.g., in the form of a modulated response) from the far field transponder of tag 1002, one skilled in the art would appreciate that RFID reader 1004 can be configured to begin initiating communications with remote device 1012 via network 1014 in response to receiving data from the far field transponder and/or before receiving data from tag 1002. In other embodiments, such as those in accordance with FIG. 10D, RFID reader 1004 may initiate communications with remote device 1012 in response to receiving a data signal from both the near field transponder and the far field transponder included in tag 1002.

Network 1014 can include any type or type(s) of networking hardware, firmware and/or software, including those used to provide wireless (cellular, WiFi, Bluetooth, mesh, star, satellite, etc.) networks, wired (e.g., Ethernet, universal serial bus, fiber optic, etc.) networks and/or combinations thereof. Network 1014 can likewise include one or more public networks (e.g., the Internet), private networks (e.g., confined to a retail store or amusement park), or hybrid public/private networks. Additionally, system 1000 may include one or more other devices that are not shown, such as other computers, RFID readers, tags, display monitors, cameras, barcode readers, printers, etc., which may be configured to perform various functionality, such as that discussed herein as well as that not explicitly detailed herein (including, e.g., system diagnostics, system configuration, statistical gathering, remote monitoring, etc.).

After RFID reader 1004 relays the data received and/or sends related RFID reader data derived from tag 1002, remote device 1012 can be configured to receive and/or process the RFID reader data. For example, remote device 1012 can be configured to reference one or more databases to authenticate tag 1002 based upon the data provided by tag 1002's transponders. For example, each transponder of tag 1002 can modulate the interrogation to include its UID. After receiving and processing the RFID reader data, remote device 1012 can transmit data back to RFID reader 1004, from which RFID reader 1004 can authenticate tag 1002 as being valid and respond accordingly (e.g., unlock a door, display information, offer a service, etc.). RFID reader 1004 can also determine that the tag is invalid and not perform or cause any action, or notify a user of the invalid tag.

Figure 11:
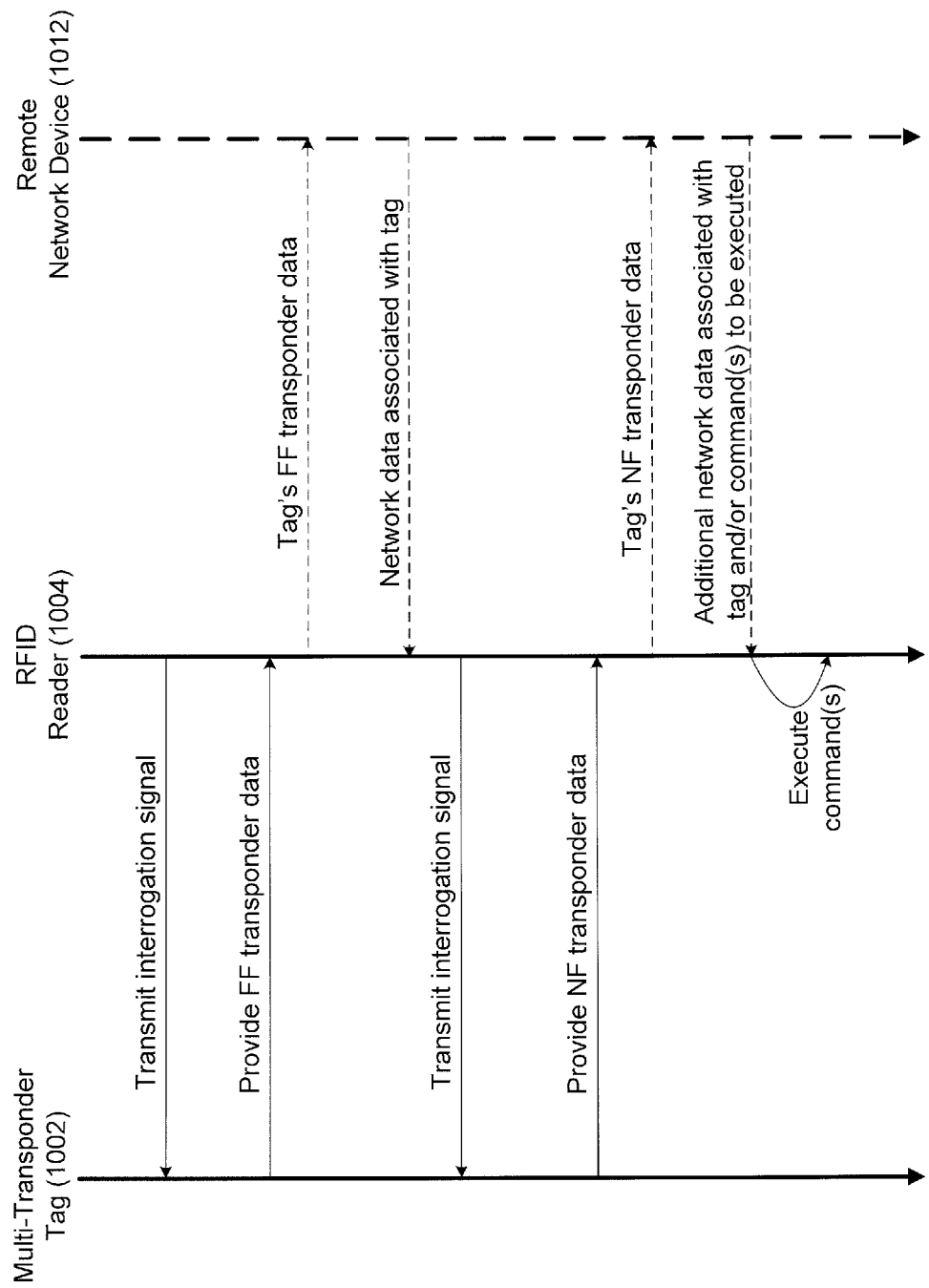
FIG. 11 shows a communications flow diagram in accordance with some embodiments.

FIG. 11 shows a communications flow diagram in accordance with some embodiments. The RFID reader (e.g., RFID reader 1004) can begin some embodiments by transmitting an interrogation signal. In response to the dual-transponder tag (e.g., tag 1002) receiving the interrogation signal, the dual-transponder tag can be activated and/or transmit a modulated response derived from the data stored in the memory of the far field transponder(s). This is something referred to herein as transmitting the FF data. For example, the tag including one or more active transponders, which are configured to only provide data wirelessly in response to receiving a predetermined interrogation signal or subsequent to conducting handshaking (which may require two-way communications that the near field transponder is unable to execute due to the distance to the RFID reader). In other embodiments, both the FF and NF data is provided wirelessly by the RFID tag, but the transponders' respective read ranges allow the RFID reader to only receive the FF data.

The RFID reader can process the FF data received from the RFID tag. In addition to or instead of initiating an action associated with the FF data (e.g., unlocking of an automatic door, electronic payment of a highway toll, among others), the RFID reader can begin executing offline and/or local processes for validating the authenticity of the tag. The RFID reader can be configured to transmit a second or continue transmitting the initial interrogation signal. If a second interrogation signal is transmitted, it may be the same or different than the initial interrogation signal. In response to receiving the second interrogation signal, the dual-transponder RFID tag may respond by sending NF data. The RFID reader, however, may not receive the NF data until the RFID reader is within the near field transponder's range.

After receiving the RFID tag's FF data and NF data, the RFID reader can, for example, proceed with validating the authenticity of the dual-transponder RFID tag without referencing remotely stored data (thereby omitting the functionality shown by the dashed lines in FIG. 11). For example, the RFID reader can be configured to validate the far field transponder and near field transponder individually, and/or validate the pair of transponders together. Some examples of validating a RFID tag without accessing a network and/or network devices are discussed in reference to, e.g., FIG. 14.

In some embodiments, one or more of the communication exchanges represented by dashed lines in FIG. 11 can be implemented to enable the RFID reader to conduct network-based validation (sometimes referred to herein as "online validation") of the dual-transponder tag. For example, after receiving the FF data from the dual-transponder tag, the RFID reader can be configured to send data associated with and/or derived from the far field transponder to a remote device (e.g., remote device 1012). For example, the RFID reader may transmit the UID or other RFID tag data (regardless of whether the FF data is encrypted), which the remote networked device can use to look up a database entry. The database entry may, for example, identify a near field tag UID or other information used to identify the near field transponder that is associated with the far field transponder on the tag.

The remote device can then return the network data associated with the tag. In addition to the near field UID and/or other identifying data for the near field transponder, the network data may also include, for example, data indicating how the RFID reader should seek the NF data. For example, the network data can include interrogation frequency setting information for the RFID reader, interrogation pulse duration information, and/or any other communication parameter that may (or should) be used by the RFID reader to generate a signal, such that the signal targets or otherwise causes the near field transponder of the tag to wirelessly provide its NF data.

In response to receiving and processing the network data, the RFID reader can transmit the second interrogation signal. In some embodiments, the second interrogation signal can be based on the network data. In some embodiments, the second interrogation signal can be the same as the first interrogation signal.

The second interrogation signal can cause the near field transponder of the tag to wirelessly provide NF data derived from the data stored in the NF memory. In some embodiments, some or all of the NF data is provided in response to the RFID tag determining that it is within the near field transponder's range. Such a determination may be made by, for example, conducting a two-way communications exchange. For example, the RFID tag's near field transponder can be configured to query the RFID reader, and only send private or more complete data in response to receiving a receipt confirmation of the query from the RFID reader. Because the RFID reader would not be able to send the receipt confirmation unless it had received the query, the tag may confirm that the RFID reader is within the near field read range as a result of receiving the RFID reader's query response. The query response may include identifying data unique to a particular query sent by the RFID tag. The far field transponder can also be configured to execute the same or similar query-confirmation process.

Once the RFID reader has received the NF data, the RFID reader may authenticate the tag or otherwise read the data provided by the tag without accessing any other device. In other embodiments, the RFID reader may initiate additional communications with the same or different remote device and receive additional network data associated with the tag in response.

Figure 12:
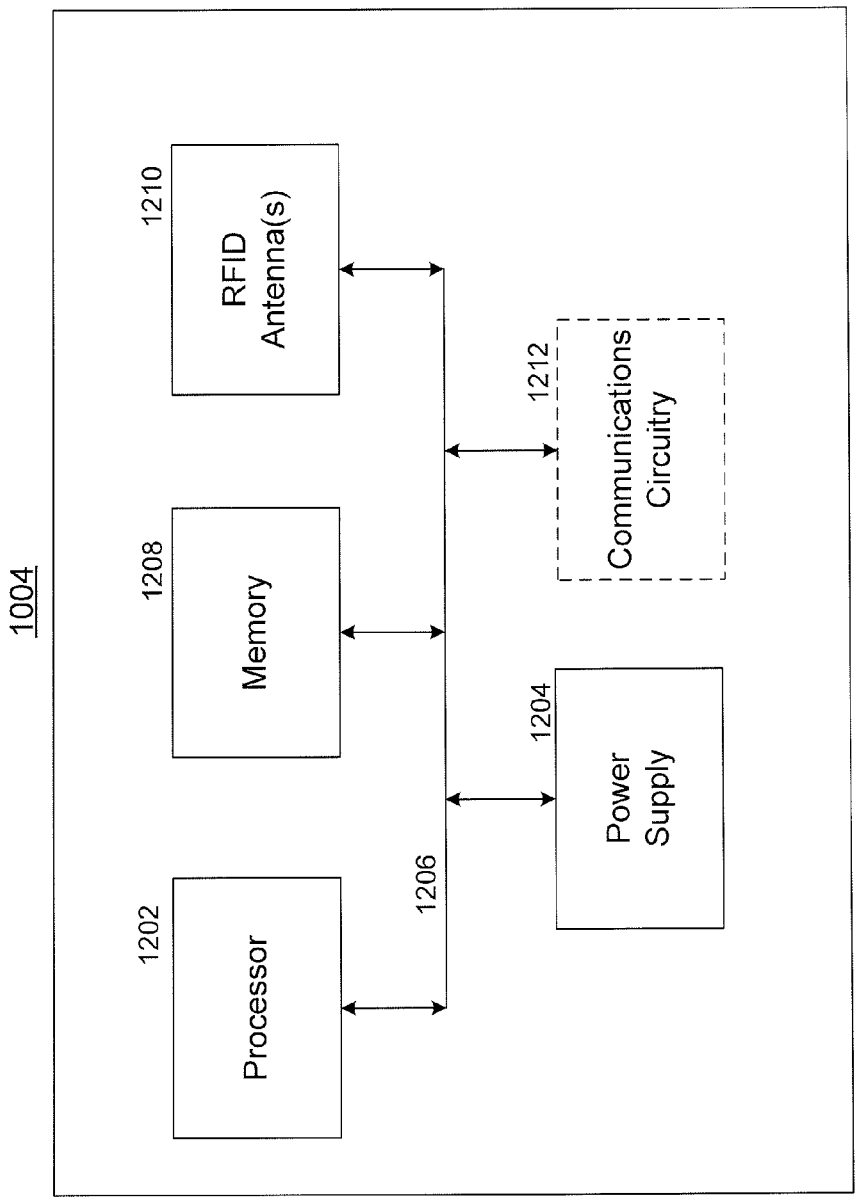
FIG. 12 shows a circuit diagram of components that may be included in an RFID reader in accordance with some embodiments.

FIG. 12 shows a circuit diagram of components that may be included in an RFID reader 1004 or other transceiver device in accordance with embodiments discussed herein. RFID reader 1004 comprises processor 1202. Processor 1202 can be, for example, a microprocessor that is configured to execute software instructions and/or other types of code portions for carrying out defined steps, some of which are discussed herein. Processor 1202 receives power from power supply 1204 that can also provide power to the other components of RFID reader 1004 as necessary. Processor 1202 communicates internally using, e.g., data bus 1206, which can be 16, 32, 64 or more bits wide (e.g., in parallel). Data bus 1206 can be used to convey data, including program instructions, between processor 1202 and memory 1208.

Memory 1208 can be considered primary memory and be included in, for example, RAM or other forms of volatile storage which retain its contents only during operation, and/or memory 1208 may be included in non-volatile storage, such as ROM, EPROM, EEPROM, FLASH, or other types of storage that retain the memory contents independent of the power state of RFID reader 1004. Memory 1208 could also be included in a secondary storage device, such as external disk storage, that stores large amounts of data. In some embodiments, the disk storage may communicate with processor 1202 using an input/output component via bus 1206 or other routing component. The secondary memory may include a floppy disk, hard disk, compact disk, DVD, memory card, or any other type of mass storage type known to those skilled in the art.

Processor 1202 can also communicate with RFID tags using one or more RFID antennas 1210. For example, RFID antennas 1210 can facilitate communication with transponders, either active or passive. RFID transponders can operate at various frequencies, including 860-960 MHz, 13.56 MHz, and 125-130 KHz, and RFID antennas 1210 can enable communication at these and any other frequencies, including those that may be later developed, using any suitable technique (e.g., the frequency hopping spread spectrum technique, the listen before talk technique, etc.). In some embodiments, to initiate communications RFID reader 1004 exposes the transponders of the tag to a RF electromagnetic field or signal, referred to herein as an interrogation signal. In the case of a passive transponder, the interrogation signal transmitted by RFID antennas 1210 energizes the transponders within the interrogation range and thereby prompts the transponders to respond to RFID reader 1004 by modulating the field in a well-known technique called backscattering. In the case of an active transponder, the transponder may respond to the electromagnetic field by transmitting an independently powered reply signal to RFID reader 1004, which can be received by RFID antennas 1210. Similarly, a semi-passive RFID transponder may respond with a modulated signal having greater read range (relative to the read range of a similar passive RFID transponder).

In some embodiments, processor 1202 can also be configured to communicate with external communication networks and devices using communications circuitry 1212, and may use a variety of interfaces such as data communication oriented protocols, including X.25, ISDN, DSL, among others. Communications circuitry 1212 may also incorporate a modem for interfacing and communicating with a standard telephone line, an Ethernet interface, cable system, and/or any other type of communications system. Additionally, processor 1202 may communicate via a wireless interface that is operatively connected to communications circuitry 1212 for communicating wirelessly with other devices, using for example, one of the IEEE 802.11 protocols, 802.15 protocol (including Bluetooth, Zigbee, and others), a cellular protocol (Advanced Mobile Phone Service or "AMPS"), Personal Communication Services (PCS), or a standard 3G wireless telecommunications protocol, such as CDMA2000 1x EV-DO, GPRS, W-CDMA, LTE, and/or any other protocol.

Figure 13:
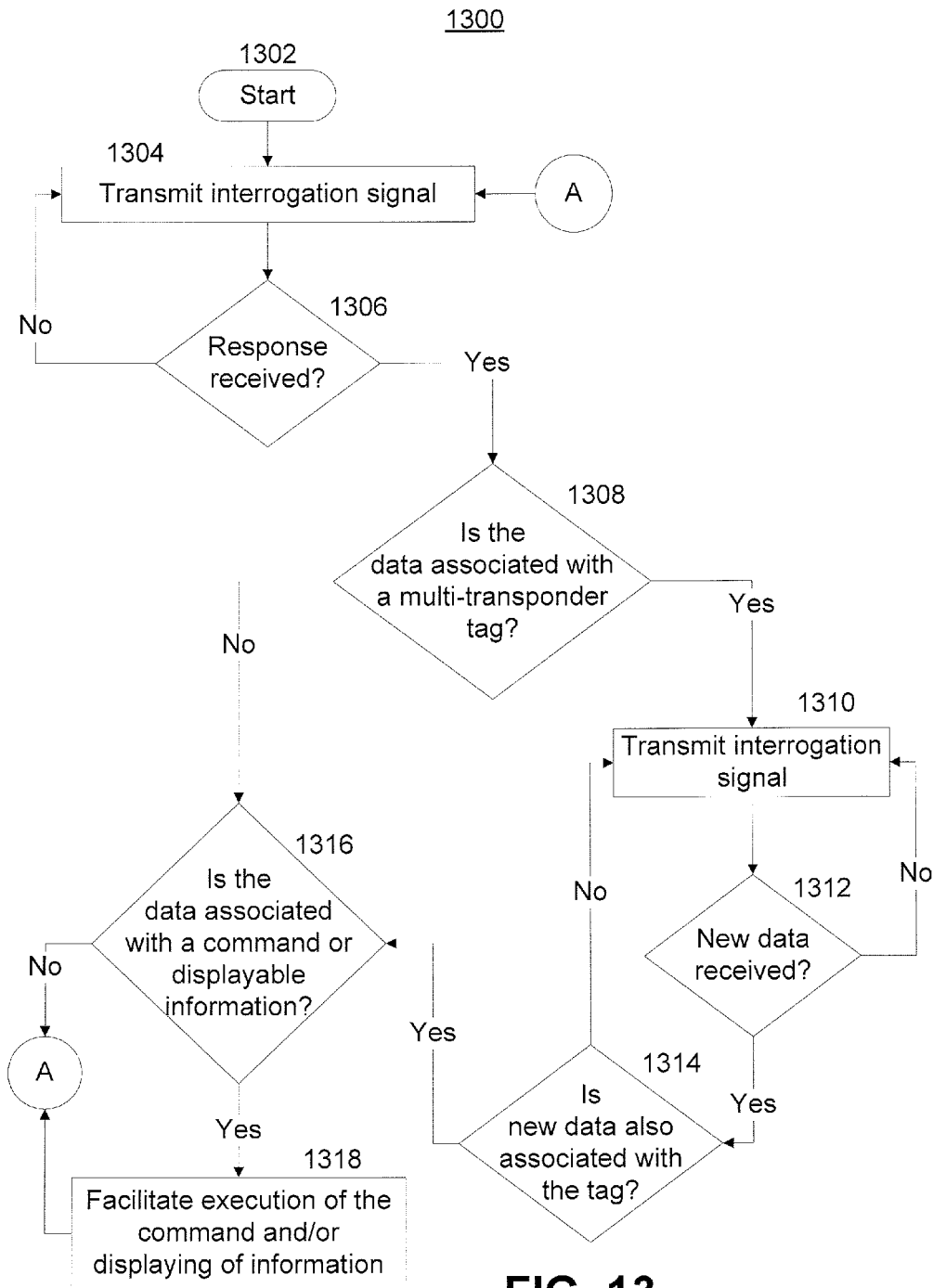
FIGS. 13 and 14 show machine-implemented processes that can be employed by circuitry of a RFID reader and/or one or more other devices in accordance with some embodiments.

FIG. 13 shows process 1300 as an example of functionality implemented by the processor of a RFID reader, such as processor 1202, in conjunction with a dual-transponder tag, wherein both transponders of the tag are configured to operate independently, using the same protocol, and without wirelessly coupling to each other. Process 1300 starts at 1302.

The RFID reader transmits an interrogation signal at 1304 and awaits a response from a tag's transponder at 1306. If no response is received, process 1300 returns to 1304 and transmits another interrogation signal and/or continues transmitting the first interrogation signal. When a response is received at 1306, the RFID reader can determine at 1308 whether the data of the response is associated with a dual-transponder tag. The response can be a wireless RFID signal and, like the other signals discussed herein, the signal received at 1306 can be a modulated backscatter signal, an independently broadcasted signal, or any other type of signal sent by any type of RFID tag. The determination at 1308 can be made by RFID reader absent the RFID reader accessing a network device for the purpose of validating the RFID tag. The RFID reader can make the determination at 1308 based on RFID transponder data contained within the signal received at 1306. In other embodiments, the determination of 1308 can be made with the assistance of online and/or other type of external device and/or network accessed device.

In response to determining at 1308 that the data received from the transponder is associated with a dual-transponder tag, process 1300 proceeds to 1310 and a second interrogation signal is transmitted. The second interrogation signal can be the same or similar as the interrogation signal transmitted at 1304, or the second interrogation signal can be, for example, targeted at a particular transponder or type of transponder (based on, e.g., data derived from a remote device or the response received at 1306).

At 1312, a determination is made as to whether new data is received (as opposed to continuous receipt of only the original data or derivation thereof received at 1306). In this regard, the RFID reader can be configured to wait for NF data from a RFID tag, while receiving FF data from the same RFID tag. The RFID reader can be configured to continuously, periodically or randomly transmit the second interrogation signal at 1310 until, for example, a timer expires, another event occurs, and/or new data is received at 1312.

In response to new data being received at 1312, the RFID reader can be configured to process the new data, including making a determination at 1314 as to whether the new data is associated with the original RFID tag. The determination of 1314 can be made based on data received at 1306 and/or 1312 and, in some embodiments, in combination with data stored in the memory of the RFID reader or stored remotely from the RFID reader (at, e.g., a network device). Some examples of how the determination of 1314 can be made offline (e.g., without using a network as discussed above and below, such as in reference to FIG. 14). Some examples of how the determination of 1314 can be made with network access are also discussed herein.

A number of advantages can be realized by associating different types and/or sets of data with different transponders of the same RFID tag. For example, the RFID tag's FF data can be more generic, public data, while the RFID tag's NF data can be more user-specific, private data. In addition to the examples discussed above, the tag can be incorporated into a government issued driver's license. The FF data can identify the issuing state government and/or whether the driver is over the age of 18 and/or 21, and the NF data can be configured to include more personalized information, such as the driver's name, license number, and home address. In this regard, the computer of a police car may begin accessing the appropriate databases before the officer has even asked to see the driver's license. Once the police officer has the driver's license in hand, driver's license can be brought within the driver's license near field read range, and the driver's personal information can be read and sent through the database(s), thereby expediting the traffic stop.

As example related to the travel industry, the FF data may indicate whether a traveler is allowed to access a cruise ship or airline hospitality lounge, while the NF data may provide the traveler's credit card or other personalized account information that can be used to purchase goods and services on the cruise ship or in the hospitality lounge. In this regard, the far field transponder can be encoded (using, e.g., a printer-encoder such as those incorporated by reference above) with only an identifier to a database record, or perhaps even only a "type" identifier. For example, in a frequent flyer card, the far field transponder can be encoded to only identify Silver, Gold, and Platinum level members, but not include a unique user ID. Ski resorts may also use dual-transponder tags (far field acting as a lift ticket, while near field allows for the purchase of goods or services at the resort restaurant or gift shop).

As such, different tags of the same generic group (e.g., state, level of membership, level of access, etc.) would be identical outside the near field read range, thereby eliminating the risk of an individual being identified from a distance. The near field transponder, however, might contain the individual's personal or other species of information (such as, e.g., the driver's license number, frequent flyer number, etc.) thereby allowing for personal identification at a relatively short range.

In response to a determination being made at 1314 that the new data is not associated with the original RFID tag, process 1300 can return to 1310 and continue to transmit the second interrogation signal. In some embodiments, process 1300 may simultaneously return to 1308 if the new data is unrelated to the RFID tag that provided the original data, and begin executing a second string of process 1300, for the second RFID tag, in parallel with the first string for the original RFID tag.

In response to a determination being made at 1314 that the new data is associated with the original RFID tag, process 1300 can proceed to 1316. Process 1300 can also advance to 1316 in response to determining at 1308 that the original data is not associated with a dual-transponder RFID tag but is instead associated with a single transponder RFID tag. The data the RFID reader has received from the tag, whether it is a dual-transponder tag or not, may include a command or other information that initiates an automated action. Examples of automated actions may include the automated granting of access (e.g., unlocking of a door), the displaying of information (e.g., person's picture and frequent flyer number), the transacting of an electronic payment, any other action, or combination thereof.

In response to determining at 1316 that the data is associated with displayable information or an executable command (based on, e.g., the formatting and/or content of the data received from the tag, data received from a network device, or combination thereof), the RFID reader and/or other device can facilitate the execution of the command and/or display the associated information at 1318. After 1318 or in response to determining at 1316 that the data is not associated with displayable information or an executable command, process 1300 can return to 1304 and begin transmitting the first interrogation signal again. In other embodiments, the determination of 1308 can be omitted from process 1300, the data received at 1306 can be stored in memory of the RFID reader for later reference, and 1310 can be performed simultaneously with 1316.

Figure 14:
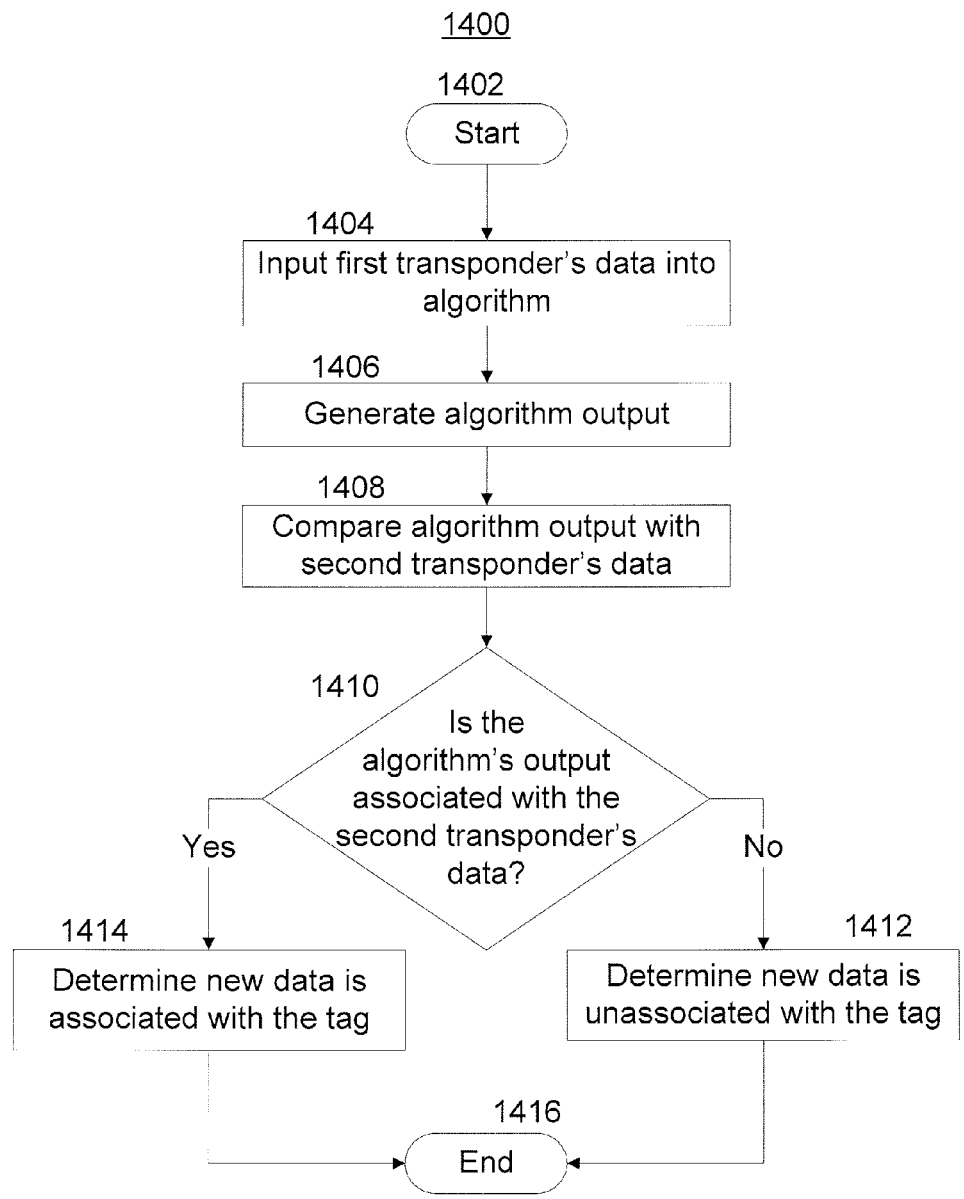

As noted above, the processor of an RFID reader, such processor 1202, can be configured to use hash functions, block ciphers, a combination thereof and/or any other type of approach and/or algorithm to validate the far field transponder independent of the near field transponder, to validate the near field transponder independent of the far field transponder, or to validate the pair of transponders based at least partially on the data of the other. FIG. 14 shows process 1400, which is an example of how a processor of a RFID reader or other type of device can be configured to determine that data received from two transponders are associated with each other and/or the same RFID tag. By determining two transponders are associated with each other, the RFID reader can be configured to conclude that it is communicating with a valid, dual-transponder tag and can respond accordingly (e.g., provide actions, examples of which are discussed herein). Process 1400 can be executed while the RFID reader is offline (e.g., unable to communicate with a network) or without communicating to a network device, even if online and configured to.

Process 1400 starts at 1402, and the RFID reader can process the data received from the two transponders (e.g., at 1306 and 1312 of FIG. 13) by inputting at least a portion of the data into an algorithm, which may be saved in the memory of the RFID reader. For example, a UID and/or other data received from a first transponder (e.g., the original transponder data received at 1306 or the new transponder data received at 1312) can be inputted into the algorithm at 1404. The algorithm may utilize, for example, a hash function, a private key, block cipher(s), and/or any other type of validation tool. Block ciphers and cryptographic hash functions, for example, are generally adapted to take a set of data and transform it via a specific function and/or key, which may or may not be stored in the RFID memory.

For example, the far field transponder can be validated without the RFID reader communicating with a network device by inputting at 1404 a previously ciphered or hashed far field UID (and/or other FF data), which is derived from information stored in the RFID tag's FF memory. As another example, the near field transponder can be validated by inputting at 1404 a ciphered and/or hashed near field UID (and/or other NF data), which is derived from data stored in the tag's NF memory.

The RFID reader (with knowledge of the key) can then validate the inputted transponder data using a key stored in the memory of the RFID reader. For example, at 1406, the processor of the RFID reader can generate an algorithm output based on the inputted transponder data and the key. The algorithm's output can then be compared at 1408 to the other transponder data received by the RFID reader. For example, if the data (or portion thereof) received at 1306 of FIG. 13 is used as the algorithm's input at 1404 of process 1400, the data received at 1312 of FIG. 13 can be compared to the algorithm's output at 1408. As another example, if the data (or portion thereof) received at 1312 of FIG. 13 is used as the algorithm's input, the data received at 1306 of FIG. 13 can be compared at 1408 to the algorithm's output.

If the algorithm's output (based on the original data from 1306 being used as an input) is, e.g., different than the second transponder's data (or derivation thereof), a determination is made at 1412 that the new data (from, e.g., 1312) is not associated with the data received previously (e.g., at 1306) and, therefore, the transponders that sent the data are not associated with each other and/or the same RFID tag. Block 1412 indicates, for example, process 1300 of FIG. 13 would proceed to 1310 after 1314, and process 1400 would then end at 1416.

If the algorithm's output is associated with (e.g., at least substantially the same as, a subset thereof, otherwise related, etc.) the second transponder's data (or derivation thereof), a determination is made at 1412 that the new data (from, e.g., 1312) is associated with the data received previously (e.g., at 1306) and, therefore, the transponders that sent the data sets are associated with each other and/or the same dual-transponder RFID tag. Block 1414 indicates, for example, process 1300 would proceed to 1316 after 1314, and process 1400 would then end at 1416.

These are only a few examples of algorithms that can offer a relatively stronger method of validation (as compared to the UID association protocol discussed above) that can be performed without accessing a network device. Without the decryption key and/or function, it is relatively difficult, if not statistically impossible, to predict the outputs required to determine whether the RFID tag is authentic. For example, at least one block cipher and/or cryptographic hash function can be used to code at least a portion of the tag's data (such as, e.g., the UID and/or other tag data), and the result can be stored in a separate memory location on the same tag. The RFID reader can then be configured to validate the tag with only knowledge of the key and/or function. Additionally, use of an asymmetric key algorithm can allow different public/private keys to be used for encoding and validating the data. In this regard, only the tag issuer may know the private key, while the RFID reader would have knowledge of the public key used to validate tags based on the encrypted or coded NF and FF data (such as, e.g., near field and far field UIDs).

Additionally, some embodiments may comprise a method of validating the tag based on data derived from both transponders and/or data derived from indicia (e.g., visual, infrared, ultraviolet, etc.) that is printed onto the tag, wherein the method is performed by the RFID reader. For example, the RFID reader can be configured to use the combination of UIDs received from an RFID tag as a method of guarding against transponder cloning since each UID is guaranteed to be unique. (A UID currently comprises a numeric identifier, generally represented by between 16 and 64 bits of data, that is programmed into and permanently locked by the manufacturer of the transponder. The far field transponder and near field transponder may have different UIDs.) The UIDs of both the RFID tag's transponders can be combined (through concatenation, or otherwise), and the combined data can be ciphered or hashed and stored in the NF memory only, the FF memory only, or a combination of the two memories. If, for example, the combined, encrypted data is stored in the NF memory only, the far field transponder may contain no near field information and/or be unable to access information about the tag's near field transponder.

In other embodiments, multiple algorithms may be used by the RFID reader to validate a dual-transponder tag, with a first algorithm being dedicated to the far field transponder data and a second algorithm (maybe having a different key) being dedicated to the near field transponder data. In this regard, the RFID reader (with knowledge of the keys and/or other algorithms) can be configured to use, for example, the far field UID as input to a first validation algorithm and the near field UID as input to a second validation algorithm, and then compare the outputs of each algorithm.

FIGS. 15A and 15B show a system, namely system 1500, which is similar to system 1000 discussed above and can be configured to implement, for example, one or more of the processes, such as process 900, discussed above. A number of the same and/or substantially similar components, devices and/or features of system 1000 can be included in system 1500, as shown in FIGS. 15A and 15B. For example, tag 1002, RFID reader 1004, NF range 1008, FF range 1010, remote device 1012 and network 1014 can be the same or similar to those discussed above in connection with system 1000.

System 1500 also includes one or more additional RFID readers, such as readers 1502A, 1502B and 1502C, which can be configured to receive one or more wireless signals and/or other communications from one or more RFID transponders. Each of readers 1502A, 1502B and 1502C can be positioned at different locations in a given area. For example, readers 1502A, 1502B and 1502C can be located at different boarder crossing gates at a single boarder crossing area, retail store cash registers and/or pricing equipment in one or more retail stores, amusement park lines at the same amusement park, throughout a car dealer lot/showroom, and/or any other place where lines are formed and/or people/animals/items may be dispersed.

In some embodiments, one or more of readers 1502A, 1502B and/or 1502C can lack the ability to generate their own interrogation signals and can instead be configured to listen to the backscatter modulation of the interrogation signal provided by RFID reader 1004. In such embodiments, and as shown in FIGS. 15A and 15B, readers 1502A, 1502B and/or 1502C may be positioned at various locations within the area that receives RFID reader 1004's interrogation signal (e.g., interrogation range 1006 discussed in connection with FIGS. 10A and 10B).

Regardless of whether one or more of readers 1502A, 1502B and/or 1502C are configured to provide their own interrogation signals, the location of the readers 1502A, 1502B and 1502C can be fixed, known and/or otherwise used by system 1500. For example, if reader 1502B is able to communicate with the near field transponder of tag 1002 as shown in FIG. 15B, system 1500 may be configured to determine that tag 1002's location is (or at least should be) proximate to reader 1502B. Upon accessing a table and/or other information related to a known and/or relative location of reader 1502B, a relative and/or absolute location of tag 1002 may be determined based on the information associated with reader 1502B.

As another example, remote device 1012, RFID reader 1004 and/or any other component of system 1500 (which may or may not be shown) can be instead or additionally configured to determine the location of tag 1002 (e.g., RFID reader 1004 can be configured to provide real time locationing system ("RTLS") functionality). In addition to determining the location of tag 1002, other information related to tag 1002 can be determined (e.g., based on the tag's FF UID and/or data stored in a storage device). The location information and/or the other information can then be used to call and execute one or more specific subroutines using one or more particular components of system 1500. As referenced herein, a subroutine may comprise one or more instructions and/or other commands that cause one or more components (and/or the components' processors) to be configured to perform one or more particular functions. The subroutines can be stored, for example, on non-transitory storage mediums.

For example, RFID reader 1004 can locate tag 1002 using RTLS functionality. The FF UID of tag 1004 can be communicated to RFID reader 1004, and both the FF UID and the location of tag 1004 can be transmitted by RFID reader 1004 to remote device 1012 via network 1014. Remote device 1012 can be configured to process the data received from RFID reader 1004, retrieve a verification protocol stored in memory and command a reader within range of tag 1002's NF transponder (such as reader 1502B in FIG. 15B) to attempt to execute the verification protocol by, e.g., communicating with tag 1004 and verifying the NF UID associated with tag 1004. If the NF UID cannot be verified where tag 1002 was determined to be, an alert may be generated by system 1500 that indicates, for example, an emulator is being used to simulate the FF transponder of tag 1002. Personal, cameras, and/or other equipment included in system 1500 (but not shown) may be directed to the area where RFID reader 1004 determined tag 1004 should be located.

Upon verification of tag 1002 (e.g., reading the expected NF UID in the location determined using RTLS) and/or instead of calling a verification subroutine, another subroutine may be called and/or executed by system 1500 (e.g., in response to receiving location and/or other information associated with tag 1002. For example, system 1500 may be installed in a hotel parking garage and used to grant access to both hotel employees and guests. Tag 1002's FF transponder may provide the at least some data that is the same as or similar to FF data provided by other tag's FF transponders, and all tags that transmit that FF data can be enabled to grant all authorized people access to the parking garage. Additionally or alternatively, the FF UID and/or other FF data associated with tag 1002 may be used by system 1500 to determine whether tag 1002 is assigned to a specific and/or type of user (e.g., employee, guest, etc.). Upon determining whether tag 1002 is assigned to, e.g., an employee or guest, system 1500 can begin preloading and/or executing a subroutine that corresponds with the user. For example, there may be a first subroutine that is associated with a valued guest identifier (e.g., calling the concierge, bell-hop, etc.) and a second subroutine that corresponds to an employee identifier (e.g., logging the time of arrival for purposes of "punching-in" to work, etc.). For example, the valued guest may hold a credit card that includes both NF and FF transponders, and the hotel's system may identify the credit card's FF UID and/or other FF data as being associated with the valued guest (based on, e.g., past visits, information associated with the current reservations, etc.). In response to determining the credit card has arrived at the hotel's parking garage and/or other location in the hotel and in response to receiving information from the tag, the system may begin executing a very-important-person ("VIP") guest arrival subroutine (e.g., call bell-hop, begin check-in process, etc.).

As yet another example, system 1500 may be located within a retail store and/or hospital. Readers 1502A, 1502B and/or 1502C can be included in kiosks and/or other types of purchasing, dispensing and/or informational stations, among others. Upon locating a FF transponder associated with a dual-transponder tag, such as tag 1002, system 1500 may activate the nearest kiosk to enable the reading of tag 1002's NF transponder and provide the customer/worker/patient/user the ability to learn more information, obtain access to and/or purchase a product, among other things. In this regard, energy savings and/or security may be realized by allowing kiosks to remain in a stand-by and/or locked mode until needed by an authorized or other type of user.

The subroutines discussed above are but a few examples of various subroutines that may be retrieved and/or executed in response to receiving information from one of the transponders included in a dual-transponder tag. In some embodiments, one or more additional or alternative subroutines may be executed by system 1500 (or system 1000 and/or any other system in accordance with embodiments discussed herein). Similarly, one or more additional or alternative subroutines may be executed in response to receiving information from both transponders included in a dual-transponder tag.

Figure 16:
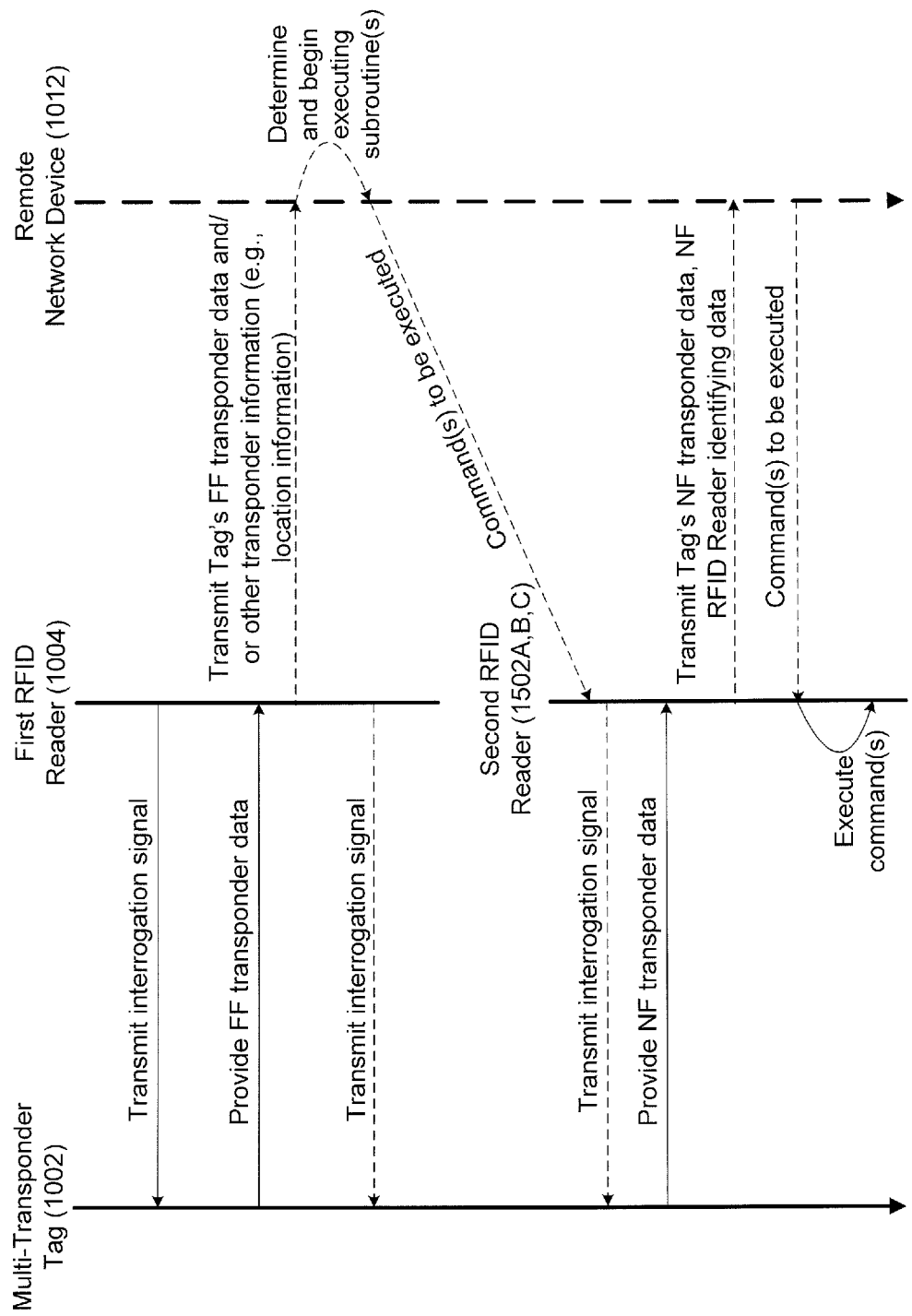
FIG. 16 shows a communications flow diagram in accordance with some embodiments.

FIG. 16 shows a communications flow diagram in accordance with some embodiments, such as those discussed in connection with FIGS. 15A and 15B. A first RFID reader (e.g., RFID reader 1004) can begin the process flow, in some embodiments, by transmitting an interrogation signal. In response to the dual-transponder tag (e.g., tag 1002) receiving the interrogation signal, the dual-transponder tag can be activated, transmit and/or otherwise communicate a modulated response derived from the data stored in the memory of the far field transponder. In some embodiments, the dual-transponder tag's near field transponder may also begin communicating its NF data in response to the interrogation signal, but the transponders' respective read ranges may allow the first RFID reader to only receive the FF data as shown in FIG. 15A. In some embodiments, depending on the relative positioning of the second RFID reader, the second RFID reader may also receive the FF data and/or the NF data of the dual-transponder tag.

The first RFID reader can process the FF data received from the RFID tag. In addition to or instead of initiating an action associated with the FF data (e.g., unlocking of an automatic door, facilitating electronic payment of a highway toll, among others), the RFID reader can begin executing an offline and/or local processes, such as the subroutines discussed above.

The first RFID reader can be configured to transmit a second or continue transmitting the initial interrogation signal. Additionally or alternatively, the second RFID reader can receive a command from a remote network device to send and/or be sending its own interrogation signal. The remote network device may send the command after determining and/or begin executing a subroutine based on data received from the first RFID reader. If a second interrogation signal is transmitted by the first RFID reader and/or second RFID reader, the interrogation signal may be the same or different than the initial interrogation signal transmitted by the first RFID reader.

In response to receiving the interrogation signal, the dual-transponder RFID tag may respond by sending NF data. While the first RFID reader may not receive the NF data until and only if the first RFID reader is within the near field transponder's range, the second RFID reader may be configured to listen for and/or otherwise receive the NF data provided by the dual transponder RFID tag. For example, the second RFID reader can be configured to listen for a particular UID and then notify a central system component whether or not the UID is received (e.g., within a predetermined period of time).

In some embodiments, one or more of the communication exchanges represented by dashed lines in FIG. 16 can be implemented to enable the RFID readers to conduct network-based validation (sometimes referred to herein as "online validation") of the dual-transponder tag and/or perform various other location-based functionality that utilizes the unique architecture of the dual-transponder tag. For example, after receiving the FF data from the dual-transponder tag, the first RFID reader can be configured to send data associated with and/or derived from the far field transponder to a remote device (e.g., remote device 1012). The first RFID reader may transmit the FF UID or other tag data (regardless of whether the data is encrypted), which the remote networked device can use to look up a database entry. The database entry may, for example, identify a NF UID or other information used to identify the near field transponder that is associated with the far field transponder on the tag and instruct the closest second RFID reader to listen for the NF UID. Upon hearing the expected NF UID, the second RFID reader can execute one or more commands, or first transmit the NF UID (and/or any other data, such as data identifying the second RFID reader, its location, etc.) to the remote network device. The remote network device may than generate one or more commands based on the data received from the first RFID reader and/or second RFID reader that are to be executed by the second RFID reader and/or first RFID reader (e.g., stop transmitting an interrogation signal). The commands can then be executed by the first RFID reader, the second RFID reader and/or any other device (shown or not shown) coupled thereto (such as, e.g., a display monitor, electronic payment system, electronic door lock, security alarm, etc.). In some embodiments, one or more commands may be executed by the remote device and/or another device coupled thereto.

Figure 17:
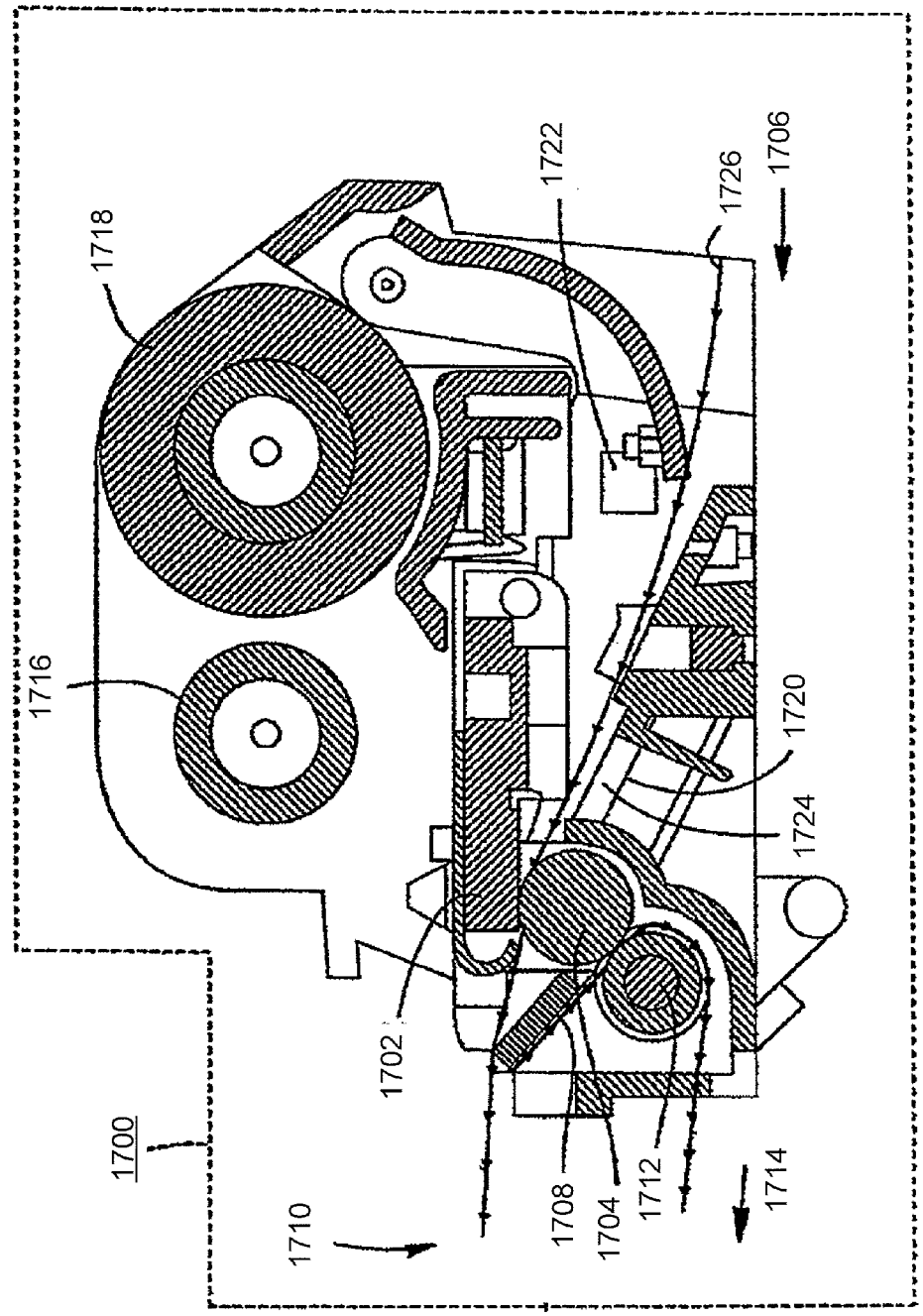
FIG. 17 shows a communications flow diagram in accordance with some embodiments.

FIG. 17 shows an example system, namely printer-encoder 1700, that can be configured to print indicia (using, e.g., infrared, visible, ultraviolet and/or any other type of ink, etc.) and/or encode data onto the digital storage device(s) of one or more multi-transponder tags, an example of which may include tag 1002 discussed above. In some embodiments, printer-encoder 1700 may be an RFID printer-encoder configured to print and encode a series or stream of tags and/or transponders. Printer-encoder 1700 includes several components, such as a printhead 1702, a platen roller 1704, a feed path 1706, a peeler bar 1708, a media exit path 1710, rollers 1712, a carrier exit path 1714, a ribbon take-up spool 1716, a ribbon supply roll 1718, a reader 1720, a controller 1722, and an encoding element 1724 (also sometimes referred to herein as a "coupling device").

As noted above, tags may include labels, cards, etc., that are carried by web 1726, which may be, e.g., a substrate liner. Web 1726 can be directed along the feed path 1706 and between the printhead 1702 and the platen roller 1704 for printing indicia onto one or more tags. The ribbon supply roll 1718 provides a thermal ribbon (not shown to avoid unnecessarily overcomplicating the drawing) that extends along a path such that a portion of the ribbon is positioned between the printhead 1702 and the tag(s). The printhead 1702 can be configured to heat up and be pressed against a portion of the ribbon onto the tag(s) to print indicia. Take-up spool 1716 can be configured to receive and spool the used ribbon. This printing technique is sometimes referred to as thermal transfer printing. However, several other printing techniques may be used including, but not limited to, direct thermal printing, inkjet printing, dot matrix printing, and/or electro-photographic printing, among others.

After printing, web 1726 proceeds to the media exit path 1710 where the tag(s) can be individually removed from the web 1726. For example, in one embodiment, pre-cut tag(s) may be simply peeled from the web 1726 using the peeler bar 1708 as shown. In other embodiments, a group of multiple tags may be printed together and transmitted downstream to an in-line cutter for subsequent separation (not shown). Various other tag removal techniques may be used as will be apparent to one of ordinary skill in the art. In applications, such as the depicted embodiment, in which one or more tags are supported by web 1726, web 1726 may be guided along a path toward the carrier exit path 1714 by rollers 1712 and/or other components after being separated from the tag(s). Structures that perform techniques for conveying or guiding the web of tag(s) along the entire feed path of printer-encoder 1700 are sometimes referred to herein as a conveyance system.

Reader 1720 can be configured to generate and transmit RF communication signals that are broadcasted by encoding element 1724 located proximate media feed path 1706. For purposes of the present description, reader 1720 and encoding element 1724 may be referred to collectively as forming at least part of a communication system. In some embodiments, encoding element 1724 may include, for example, an array coupler, some examples of which are discussed in commonly-assigned U.S. patent application Ser. No. 12/618,107, filed Nov. 13, 2009 and titled "Encoding Module, Associated Encoding Element, Connector, Printer-Encoder and Access Control System", which was hereby incorporated by reference in its entirety. As another example, encoding element 1724 may include a single antenna coupler.

Figure 18A:
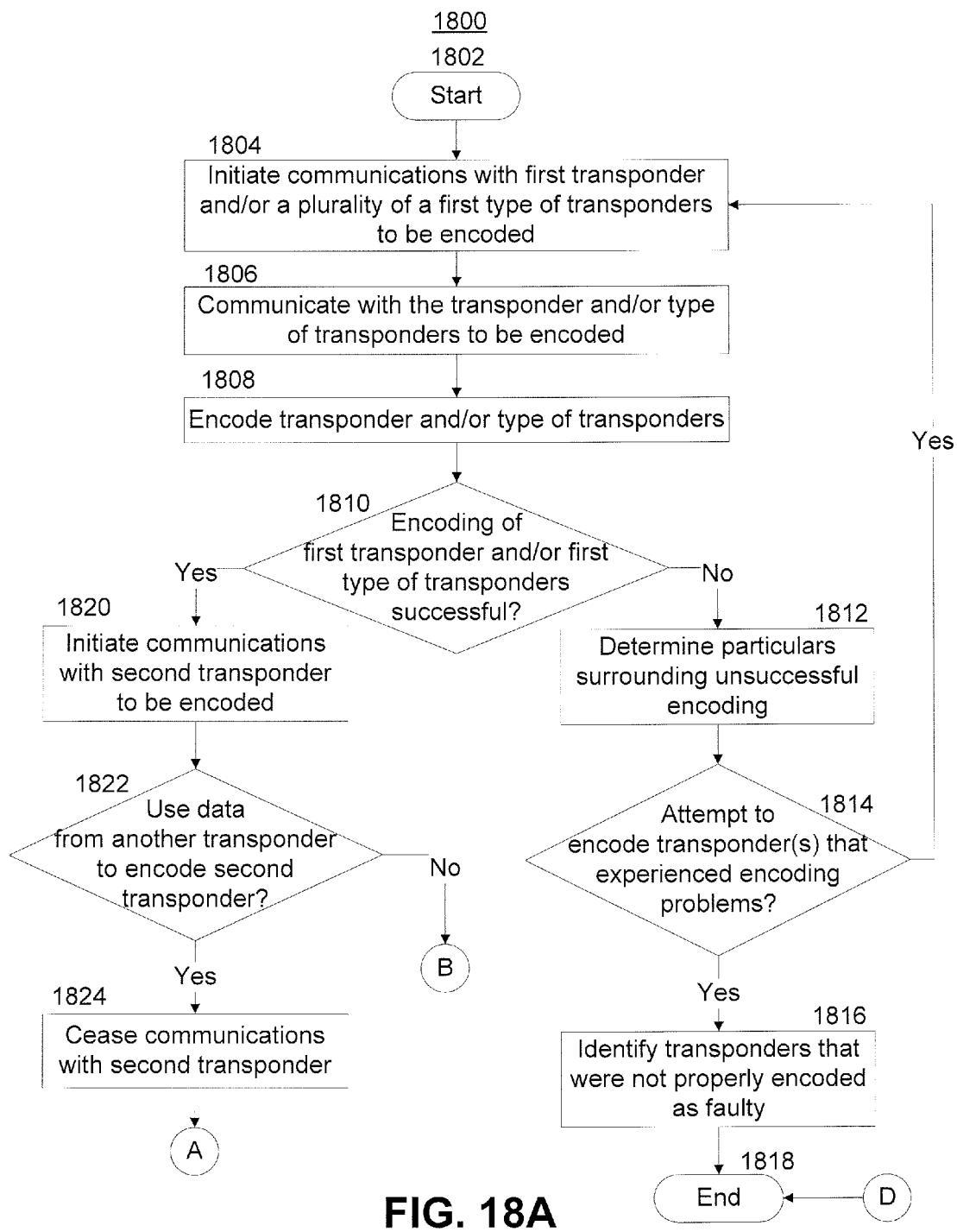
FIGS. 18A-18C show an example machine-implemented process that can be used to print and encode one or more dual-transponder tags and/or create a database of transponder associations that can be used to identify and/or validate dual-transponder tags.
Figure 18B:
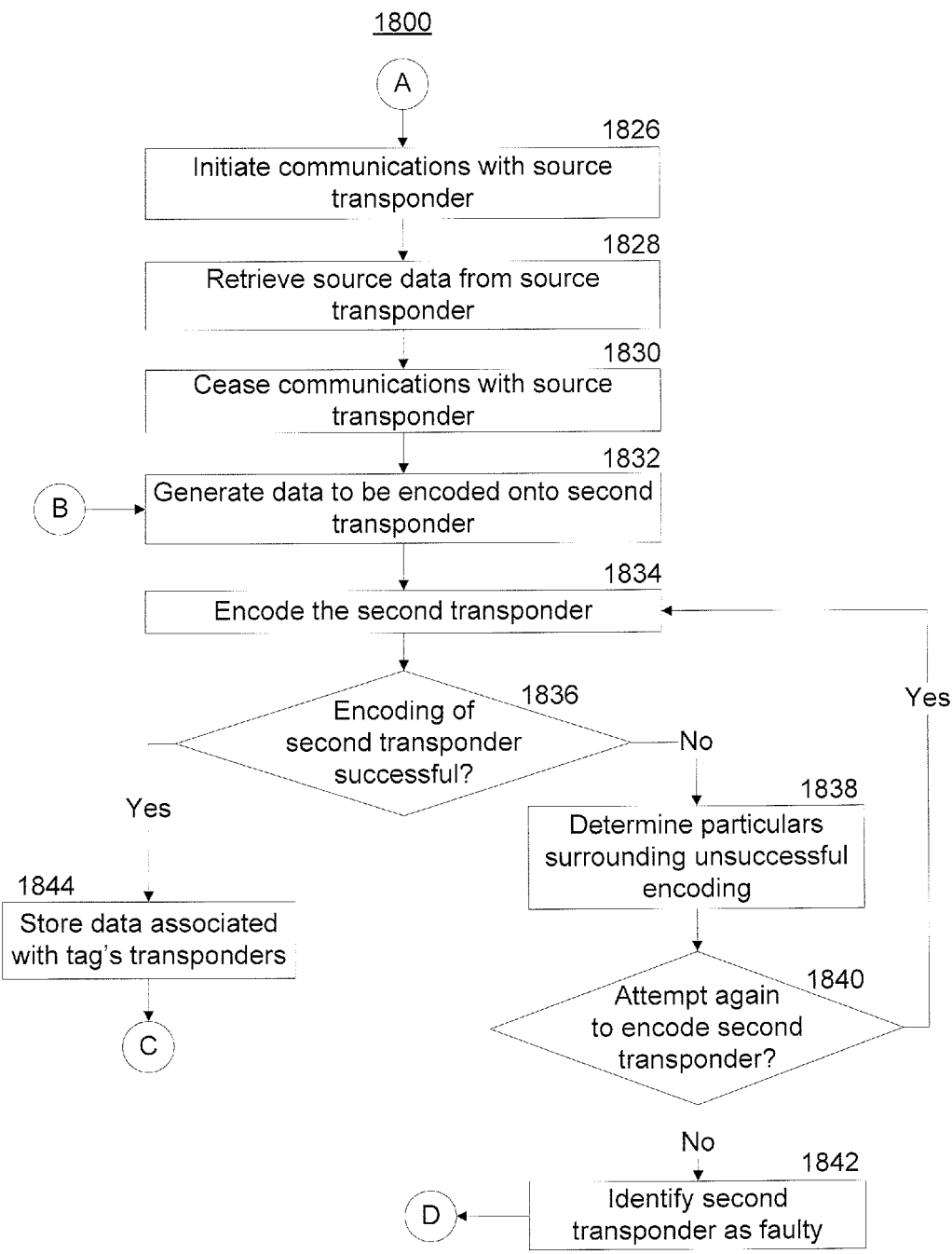
Figure 18C:
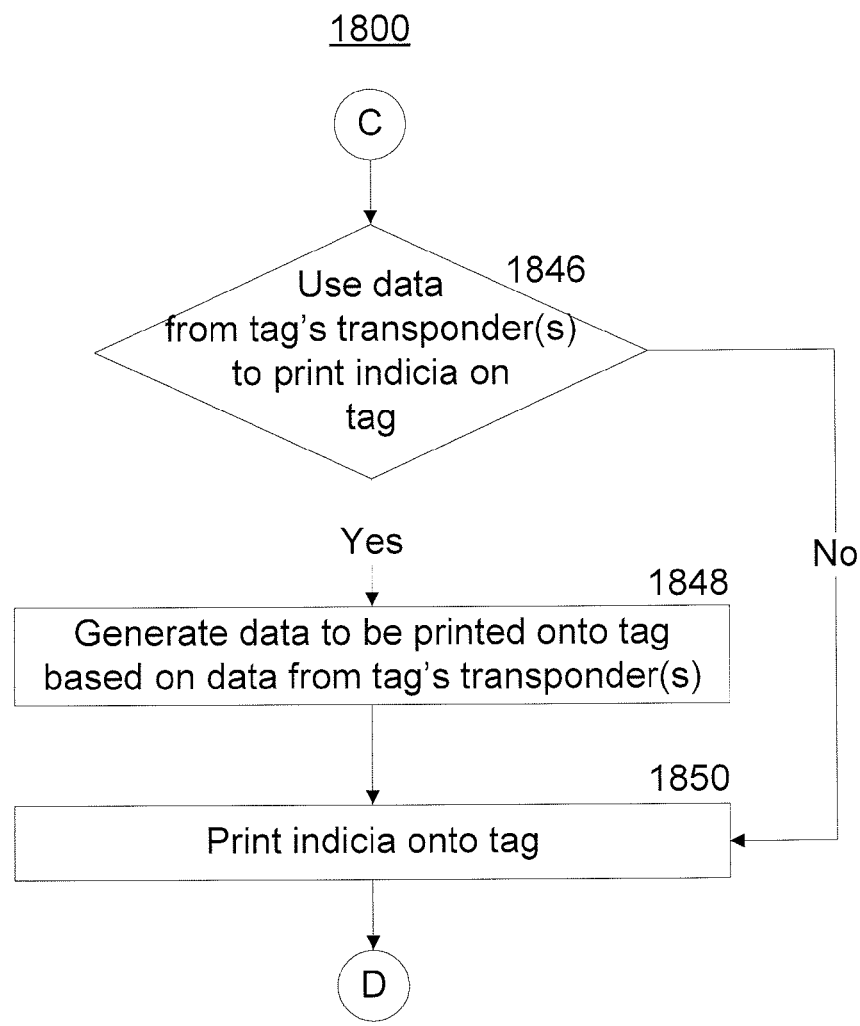

The communication system can be configured to transmit one or more electromagnetic waves for establishing a mutual coupling, such as a wireless communications path or other means for communicating, between the reader and one or more targeted transponders of a tag that is located in the transponder encoding area of printer-encoder 1700, such that data may be read from and/or written to the tag's transponder(s). As such, the transponder encoding area can be located in proximity (within centimeters) to reader 1720, which can be used as a means for transforming electrical signals into wireless electromagnetic signals that can in turn be used to program or otherwise encode a tag's transponder(s) with computer readable data, similar to how a conventional printhead is used to transform electrical signals into printed words that are human-readable. Reader 1720 can also be used as a means for reading data stored in the media's transponder(s), similar to how a bar code reader or scanner is able to transform barcodes printed on media into electrical signals and then interpret the meaning of electrical signals. An example of a process used to encoder one or more dual-transponder tags is shown in FIGS. 18A-18C.

Further to the above and below discussions, data read from the tag's transponder(s), such as the UID(s), can also or instead be used by printer-encoder 1700 (e.g., controller 1722 and/or any other type of processor) to determine at least a portion of the information to be printed onto the tag. For example, the information printed on the tag may be associated with and/or otherwise correspond to the data stored on the tag's first transponder, second transponder or both. For example, one or more barcodes and/or other machine-readable indicia printed on the tag can be derived from the tag's NF transponder, FF transponder and/or both. As another example, human readable information, such as one or more strings of alpha-numeric characters, images (e.g., photographs, clipart, pictures, etc.) and/or any other information a human may understand the meaning, can be printed onto the tag based on data read from the tag's NF transponder, FF transponder and/or both. Additionally or alternatively, data printed on the tag can be used to encode data onto the tag's NF transponder, FF transponder and/or both. In such embodiments, printer-encoder 1700 may include one or more optical and/or other types of indicia-reading components/devices configured to assist in extracting data from indicia printed, etched, molded, engraved and/or otherwise located on the tag.

Each electromagnetic wave (used to, e.g., establish the mutual coupling, read from and/or write to each transponder) can have different signal strengths depending on the distance from the encoding element, antenna size/shape, etc. The strength in the near-field usually differs from the strength of the far-field. In general, the far field of the encoding element is often too weak to activate or communicate with any of the transponders, while the near field of the encoding element is usually strong enough in the transponder encoding area such that it only activates the tag's transponder(s) in the transponder encoding area.

The processor and/or other circuitry of a printer-encoder (such as, e.g., controller 1722 of printer-encoder 1700) can be configured to encode and/or print one or more dual-transponder tags. FIGS. 18A and 18B show process 1800, which is an example of how a processor of a printer-encoder or other type or combinations of devices can be configured to print and encode one or more dual-transponder tags and/or create a database of transponder associations that can be used to identify and/or validate dual-transponder tags. Like the other methods discussed herein, process 1800 is an example in accordance with some embodiments discussed herein.

Process 1800 starts at 1802 in FIG. 18A. At 1804, the printer-encoder can initiate communications with a first transponder included in a dual-transponder tag. For example, the printer-encoder can initiate RF communications with the FF transponder or the NF transponder included in a dual-transponder tag to be encoded by process 1800. In some embodiments, at 1804 the printer-encoder can also or instead be configured to simultaneously (including near simultaneously) encode a group of transponders that are of a same type. For example, communications between the printer-encoder and a number of FF transponders included in a number of dual-transponder tags can be initiated simultaneously at 1804. Although the communications discussed herein between the printer-encoder and one or more transponders are sometimes referred to as RF communications, the communications may also or instead include any type of wireless commutations and/or wired communications (e.g., contact communications) between a transponder and the printer-encoder.

At 1806, communications may be executed with the transponder and/or group of transponders selected for encoding. Communicating with the transponder(s) can include, for example, providing at least one interrogation signal, receiving one or more backscattered modulated signals, and processing the received signal(s).

At 1808, the printer-encoder can be configured to encode the transponder and/or group of transponders selected for encoding. For example, the printer-encoder may emit a higher power signal (than, e.g., that used to read and/or initiate communications with the one or more transponders) and cause data to be encoded onto the one or more transponders. In some embodiments, all of the transponders are encoded with the same data (e.g., generic data, some examples of which are discussed above). One or more transponders of a different type (e.g., NF transponders) may also be encoded with the data (e.g., data intended for FF transponders), but these transponders can be re-encoded subsequently in process 1800, if desired. For example, all transponders on a plurality of dual-transponder tags, including a plurality of near field and far field transponders, can be encoded en masse with the same and/or similar data, and subsequently the near field transponders of the tags can be re-encoded with unique data. As another example, the far field transponders can be subsequently re-encoded with unique data. In this regard the encoding of the one or more transponders at 1808 can occur within the printer-encoder's internal transponder encoding area using one or more near field signals emitted by the encoding element of the printer-encoder. Alternatively or additionally, when encoding a plurality of transponders en masse, the transponders may be encoded using one or more far field signals when the transponders are located outside of the printer-encoder, on the supply roll (e.g., ribbon supply roll 1718) and/or anywhere else outside the transponder encoding are of the printer-encoder. One example of why a plurality of dual-transponder tags may encoded with the same data is the parking garage example given above, wherein all FF transponders that are configured to communicate the same or similar subset of data can enable a user to gain entry to a parking deck, regardless of whether the user is a hotel worker or guest.

At 1810, a determination can be made by the printer-encoder as to whether the encoding of each transponder was successful. For example, the printer-encoder can attempt to read the one or more transponders that have been encoded and confirm that the information read is consistent (within a predetermined threshold) of what was supposed to have been encoded.

In response to determining that at least one of the transponders selected for encoding was unsuccessfully encoded at 1808, process 1800 proceeds to 1812 and the printer-encoder can be configured to determine particulars surrounding the unsuccessful encoding. For example, the printer-encoder can be configured to test whether sufficient power was used during the encoding process, whether the signal was directed at the correct portion of the tag, whether the antenna (and/or other component) of the transponder is functioning properly, and/or execute any other diagnostic test(s).

At 1814, the printer-encoder can determine whether to again attempt to encode the transponder(s) that experienced encoding problems at 1808. The determination at 1814 can be based on, e.g., the diagnostic tests of 1812. For example, in response to the diagnostic tests suggesting that more power should be concentrated in a different location of the tag, process 1800 can return to 1804 and attempt to encode the transponder that was unsuccessfully encoded initially. As another example, in response to the diagnostic tests suggesting that the transponder is faulty, encoding may not be reattempted and process 1800 may proceed to 1816.

At 1816, the printer-encoder may identify the transponder(s) that were not properly encoded as faulty. For example, the UID(s) of the faulty transponder(s) may be stored, indicia may be printed on the corresponding tag that indicates the transponder is faulty, and/or any other action may be taken to prevent the user and/or printer-encoder from trying to use and/or encode the other transponder included in the tag. Process 1800 then ends at 1818.

Returning to 1810, in response to determining that at least one of the transponders selected for encoding was successfully encoded at 1808, process 1800 proceeds to 1820 and the printer-encoder can initiate communications with a second transponder to be encoded. The second transponder can be included in a dual-transponder tag that has already had its other transponder encoded. For example, the tag's far field transponder may have been encoded at 1808 and now communications with its near field transponder are being initiated at 1820. Initiating communications may include, for example, attempting to read data from the second transponder, such as the UID and/or any other data stored by the near field transponder. Communications with the second transponder may be facilitated in a manner that prevents communications with the other transponder on the tag. For example, the communications can be conducted at an appropriate power level and/or can be isolated to a specific portion of the tag that at least minimizes unintended coupling with other transponders, even if on the same tag as the targeted second transponder.

At 1822, a determination can be made as to whether data from another transponder (e.g., UID, etc.) should be used to encode the second transponder now being targeted for encoding. For example, a determination can be made whether or not a process, such as process 1400 of FIG. 14, should be used to encode the targeted transponder, or whether the targeted transponder should be encoded with data that is independent of the data encoded onto the tag's other transponder.

In response to determining at 1822 that data from another transponder should be used to determine the data to be encoded on the second transponder, process 1800 may proceed to 1824 and cease communications with the second transponder. In some embodiments, step 1824 may be omitted and communications with the second transponder may continue. Similarly, any step and/or other type of function discussed herein may be omitted, combined, reordered and/or otherwise modified without departing from the spirit of the invention.

Process 1800 continues in FIG. 18B. At 1826, communications can be issued with the source transponder, namely the transponder from which data will be used to encode the second transponder. For example, the source transponder may be the far field transponder included in the tag and the second transponder may be the near field transponder included in the same tag. As another example, the source transponder may be the near field transponder included in the tag and the second transponder may be the far field transponder included in the same tag. As yet another example, the source transponder and second transponder may be included in completely different tags (e.g., tags that are located next to each other on a roll of tags, among other arrangements).

At 1826, data can be received from the source transponder. At 1830, communications with the source transponder can be ceased in preparation for initiating encoding communications with the second transponder targeted for encoding.

At 1832, the printer-encoder can be configured to generate the data to be encoded onto the second transponder targeted for encoding. The data can be based on what was received from the source transponder. For example, the data to be encoded onto the second transponder can be a subset of the data previously encoded onto the tag's other transponder. As another example, the data to be encoded onto the second transponder can include at least portion of the data stored on the tag's other transponder. As yet another example, the data to be encoded onto the second transponder can be generated such that it is completely or at least partially different from the data stored on the tag's other transponder.

The data to be encoded onto the second transponder can also or instead be based on information the printer-encoder receives from a remote device (such as, e.g., remote network device 1012) and/or derived from an encryption and/or other type(s) of algorithm(s) (such as that discussed in connection with, e.g., FIG. 14). Additionally or alternatively, the printer-encoder may include or receive source information from a optical scanner and/or other type of component/device, which can in turn be used to generate the data to be encoded onto the first transponder (or group of transponders) and/or the second transponder. In such embodiments, process 1800 may include one or more steps similar to 1822 through 1830 that receive source data from something other than another transponder's storage device.

The functionality of 1832 may also follow 1822 in response to determining at 1822 that another transponder's data is not to be used to encode the second transponder targeted for encoding. When 1832 follows 1822, the generation of the data to be encoded onto the second transponder can lack any dependence or other type of relation to data stored on another transponder (which may or may not cause the data stored on each transponder to be related and/or similar, because special algorithms are not be implemented to cause the data to be different).

After generating the data to be encoded onto the second transponder, the second transponder can be encoded at 1834. Similar to the discussion above, the second transponder can be encoded by the printer-encoder in any suitable manner. For example, the second transponder can be physically moved to and/or otherwise positioned in/through the printer-encoder's transponder encoding area for encoding. Additionally, the encoding of the second transponder can be conducted in a manner that the data stored on any other transponder is unaffected. For example, the communications link between the second transponder and the printer-encoder can be established using a power level and a directed, narrow near field electromagnetic link that prevents other transponders from being encoded.

In some embodiments, the group of transponders can be encoded after one or more individual transponders are encoded. For example, 1834 can occur before 1808. Additionally or alternatively, and the transponder encoded individually can function as source transponder used to encode one or more other transponders as a group. For example, a single near field transponder may be configured to function as a validation key for a number of dual-transponder tags, rather than each of the tag's own near field transponder being used to validate the tag's authenticity.

At 1836, a determination can be made by the printer-encoder as to whether the encoding of the second transponder was successful or unsuccessful. The determination can be made by, for example, initiating communications with the second transponder and reading the data stored thereon.

In response to determining at 1836 that the encoding of the second transponder was unsuccessful, process 1800 proceeds to 1838 and the printer-encoder can be configured to determine particulars surrounding the unsuccessful encoding. For example, the printer-encoder can be configured to test whether sufficient power was used during the encoding process, whether the signal was directed at the correct portion of the tag, whether the antenna (and/or other component) of the second transponder is functioning properly, and/or execute any other diagnostic test(s).

At 1840, the printer-encoder can determine whether to again attempt to encode the second transponder that experienced encoding problems at 1834. The determination at 1840 can be based on, e.g., the diagnostic tests of 1838. For example, in response to the diagnostic tests suggesting that more power should be concentrated in a different location of the tag, process 1800 can return to 1834 and attempt to encode the second transponder.

As another example, in response to the diagnostic tests suggesting that the second transponder is faulty, encoding may not be reattempted and process 1800 may proceed to 1842 from 1840. At 1842, the printer-encoder may identify the second transponder that was not properly encoded as faulty. For example, the UID(s) of the faulty transponder may be stored, indicia may be printed on the corresponding tag that indicates the transponder is faulty, and/or any other action may be taken to prevent the user and/or printer-encoder from trying to use and/or encode the second transponder again. Process 1800 then ends at 1818.

In response to determining at 1836 that the encoding of the second transponder was unsuccessful, process 1800 proceeds to 1838 and the printer-encoder can be configured to store data associated with tag's transponders. The data can be stored locally and/or remotely and subsequently used to validate the transponder. The printer-encoder may also be configured to encrypt the data before and/or after storing. The data is sometimes referred to as "tag data" as the data can be specific to a particular tag.

Process 1800 continues in FIG. 18C. At 1846, the printer-encoder can determine whether the data encoded onto one or both of the tag's transponders should be used to generate the commands for printing indicia onto the tag. For example, some embodiments may include printing a code (such as a barcode), character string (such as name, word(s), code, etc.), picture (such as that of a person), image, graphic, and/or anything else onto the tag that is consistent, complimentarily and/or otherwise associated with the data stored on the tag and/or the tag's intended use given the data stored thereon.

In response to determining that data from the tag's transponder should be used to generate the indicia to be printed on the tag, process 1800 proceeds to 1848 and the printer-encoder can be configured to generate the print commands and/or other data to be printed on the tag based on the data from the tag's transponder(s). In some embodiment, the printer-encoder may reinitiate communications with the tag's transponder(s) to retrieve the data needed to print the indicia. Additionally or alternatively, as another example, the printer-encoder may simply retrieve the tag's data from local and/or networked storage device(s).

At 1850, the commands (e.g., Zebra Programming Language commands) necessary to print the indicia can be generated by the printer-encoder and the indicia can be printed onto the tag. The indicia can be human-readable, machine-readable or both.

Step 1850 may also follow 1846 in response to determining at 1846 that data from the tag's transponder should not be used to generate the indicia to be printed on the tag. In such embodiments, the print commands can be generated independent of any data stored on the tag being printed.

After 1850, process 1800 ends at 1818.

Although a single tag implementing some of the above validation approaches may still be, albeit significantly less, vulnerable to emulation if someone was able to capture the full data stored on both tags, the risk of a hacker being able to create new cards would be greatly reduced, even with access to one or many valid cards. Complete knowledge of the functions and/or keys would likely be required to compromise the validation protocols that do not require accessing a network device.

Many modifications and other embodiments of the inventions set forth herein will come to mind to one skilled in the art to which these inventions pertain having the benefit of the teachings presented in the foregoing descriptions and the associated drawings. For example, the near field and far field transponders can assume various shapes including cubic, spherical, or irregular in shape. As another example, far field transponders can be in the form of a slot, a straight conductor, a larger loop (relative to the near field transponder), or a completely separate RFID tag. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A radio frequency identification ("RFID") tag configured to communicate wirelessly with a RFID reader, the RFID tag comprising:
    a far field ("FF") transponder, comprising:
        FF circuitry configured to access FF data; and
        a FF antenna configured to define a FF read range;
    a near field ("NF") transponder, comprising:
        NF circuitry configured to access NF data; and
        a NF antenna configured to define a NF read range that is smaller than the FF read range; and
    a substrate; and wherein:
        the FF transponder and the NF transponder are both configured to communicate using the same wireless communication protocol;
        the FF antenna of the FF transponder comprises a slot antenna formed on the substrate, the slot antenna defining a nonconductive region of the FF transponder; and
        the NF antenna of the NF transponder comprises a loop antenna formed on the substrate at the nonconductive region of the FF transponder.

2. The RFID tag of claim 1, wherein at least a portion of the FF data is transmitted substantially simultaneously as at least a portion of the NF data.

3. The RFID tag of claim 1, wherein the wireless communication protocol is in compliance with at least one of an EPCglobal Generation 1 standard, an EPCglobal Generation 2 standard, and an ISO/IEC standard.

4. The RFID tag of claim 1, wherein the FF transponder and the NF transponder are both passive RFID transponders.

5. The RFID tag of claim 1, wherein the FF data includes generic data relative to the NF data.

6. The RFID tag of claim 1, wherein the FF data is different than the NF data.

7. The RFID tag of claim 1, wherein the NF data includes user-specific data.

8. The RFID tag of claim 7, wherein the user-specific data has a species relationship to the FF data.

9. The RFID tag of claim 8, wherein the FF data comprises access data that is configured to authorize physical access to an area and the user-specific data comprises transaction data that is configured to authorize a financial transaction within the area.

10. The RFID tag of claim 1, wherein the NF data includes an unique NF identifier and the FF data includes an unique FF identifier.

11. The RFID tag of claim 10, wherein the unique NF identifier and the unique FF identifier are readable near simultaneously by a reader positioned within the NF read range.

12. The RFID tag of claim 1, wherein the NF read range is less than two meters.

13. The RFID tag of claim 1, wherein the FF read range is more than nine meters.

14. The RFID tag of claim 1, wherein the FF data and the NF data are used to authenticate the RFID tag.

15. The RFID tag of claim 1 further comprising:
a memory, wherein the NF data is encrypted and stored in the memory.

16. The RFID tag of claim 1 further comprising:
a memory, wherein the FF data is encrypted and stored in the memory.

17. The RFID tag of claim 16, wherein the FF data is encrypted based on an algorithm that uses the NF data as an input.

18. The RFID tag of claim 1 further comprising:
a memory, wherein the FF data and the NF data are combined and stored in memory.

19. The RFID tag of claim 1 further comprising:
a NF storage device; and
a FF storage device, wherein the FF storage device lacks any information related to the NF transponder.

20. The RFID tag of claim 1, wherein the FF transponder and the NF transponder are both configured to communicate with the RFID reader by modulating an interrogation signal received from the RFID reader.

* * * * *